(12) United States Patent
Nagamura et al.

(10) Patent No.: US 8,669,942 B2
(45) Date of Patent: Mar. 11, 2014

(54) INPUT DEVICE HAVING KEY TOPS

(75) Inventors: Yoshiaki Nagamura, Osaka (JP);
Hiroaki Nishimura, Osaka (JP);
Haruka Kaneko, Kyoto (JP); Tetsuya Kawamoto, Osaka (JP); Shintaro Tanaka, Osaka (JP); Takashi Tsukahara, Osaka (JP)

(73) Assignee: Panasonic Corporation, Osaka (JP)

( * ) Notice: Subject to any disclaimer, the term of this patent is extended or adjusted under 35 U.S.C. 154(b) by 160 days.

(21) Appl. No.: 13/233,757

(22) Filed: Sep. 15, 2011

(65) Prior Publication Data
US 2012/0081288 A1    Apr. 5, 2012

(30) Foreign Application Priority Data

Sep. 30, 2010 (JP) .................................. 2010-222294

(51) Int. Cl.
*G06F 3/02* (2006.01)
(52) U.S. Cl.
USPC ............................ 345/168; 345/169; 400/490
(58) Field of Classification Search
None
See application file for complete search history.

(56) References Cited

U.S. PATENT DOCUMENTS

| 6,103,979 | A | 8/2000 | Motoyama et al. |
| 7,102,620 | B2 * | 9/2006 | Harries et al. ................ 345/169 |
| 7,745,751 | B2 * | 6/2010 | Takahashi et al. ............ 200/341 |
| 2003/0049066 | A1 | 3/2003 | Cheng |

FOREIGN PATENT DOCUMENTS

| JP | 7-065673 | 3/1995 |
| JP | 2003-084887 | 3/2003 |
| JP | 2003-140807 | 5/2003 |

* cited by examiner

*Primary Examiner* — Jason Olson
(74) *Attorney, Agent, or Firm* — Hamre, Schumann, Mueller & Larson, P.C.

(57) ABSTRACT

An operation unit has an operation surface for accepting an input operation. In a plan view, the operation surface has a rectangular contour including a plurality of sides and a plurality of corner portions. When each point at which extensions of adjacent two of the plural sides cross each other is defined as a virtual intersection, and when an intersection at which respective diagonals linking the virtual intersections cross each other is defined as a virtual center, the contour of the corner portion crosses the diagonal that passes through the virtual intersection and the virtual center, at a point between the virtual intersection in the vicinity of the corner portion and the virtual center. The corner portions is a specific corner portion having an intersection with the diagonal at a position closer to the virtual center than the adjacent two corner portions.

7 Claims, 20 Drawing Sheets

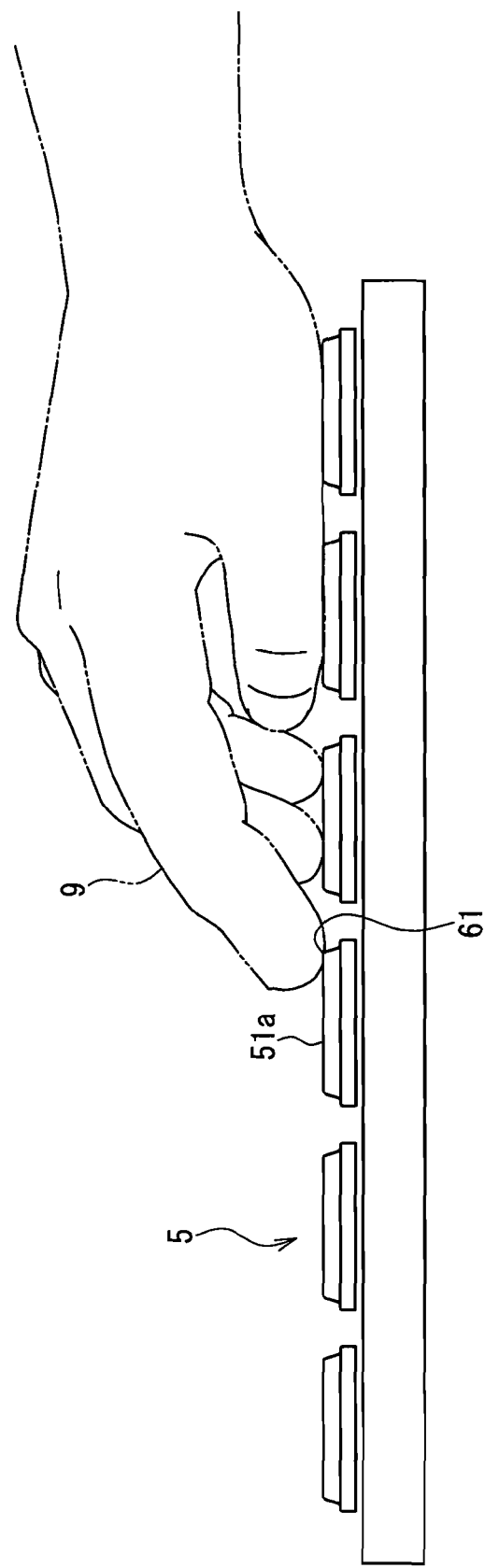

INPUT DEVICE HAVING KEY TOPS

BACKGROUND

1. Field

The present invention relates to an input device.

2. Description of Related Art

For example, a keyboard packaged with or connected to computer equipment or the like has a plurality of key tops for respective characters to be inputted. The key tops are arranged at predetermined positions in rows and columns so as to be adjacent to each other on the keyboard.

Recently, the computer equipment and the keyboard itself have become smaller and smaller. In a case of corresponding to the trend of miniaturization, it is required to decrease key pitches between the respective key tops arranged on the keyboard (spacing between the centers of two keys).

However, when the key pitches are decreased, the finger movement is restricted. As a result, a key that corresponds to a character to be inputted (hereinafter, this will be referred to as 'target key') and a key arranged in the vicinity of the target key (hereinafter, this will be referred to as 'adjacent key') may be pushed down simultaneously or consecutively. This should be avoided since when the adjacent key is pushed down, incorrect inputs and/or incorrect operations of keys will occur easily.

For the purpose of preventing incorrect operations and/or incorrect inputs, in a known keyboard, a protruding part to restrict the moving range of a finger is formed on each key top, so that the finger will be moved linearly only in a predetermined movement direction (see for example, JP 2003-84887 A).

In another known keyboard, the shape of the key tops in the right-hand area is differentiated from that of the key tops in the left-hand area, considering the operability for each of the right hand and the left hand (see for example JP 2003-140807 A).

Furthermore, for the purpose of decreasing the size without sacrificing the operability, in another known keyboard, key tops are slid so that two different switches can be operated selectively with a single key (see for example JP H07-65673 A).

In a case of forming a protruding part on the upper face of a key top as disclosed in for example JP 2003-84887 A, incorrect inputs and/or incorrect operations of adjacent keys located near the protruding part can be prevented at the time of inputting the target key. However, incorrect inputs of the adjacent keys located opposite to the protruding part side cannot be prevented, because at the side without the protruding parts, the target key and the adjacent key may be pushed down simultaneously or consecutively.

In a case where the shape of the key tops in the right-hand area are differentiated from that in the left-hand area as disclosed in JP 2003-140807 A for example, when the key pitches in either the right-hand area or the left-hand area is decreased, the target key and any of the adjacent keys may be pushed down simultaneously or consecutively. This will cause a problem in that incorrect inputs and/or incorrect operations cannot be prevented.

Furthermore, in a case where a key top is slid so that one key can operate selectively two different switches, it is required to move the fingers for inputting different keys. As a result, the target key and any of the adjacent keys may be pushed down simultaneously or consecutively. As a result, incorrect inputs and/or incorrect operations cannot be prevented.

For preventing the user's finger from contacting with an adjacent key at the time of pushing down a target key, the surface area of the operation surface of the key top to be pushed can be decreased simply (for example, it can be shaped circular). However, when the surface area of the operation surface is decreased excessively, problems may occur. For example, the decrease in the contact area between the operation surface and the finger degrades the operability at the key touch. Furthermore, the region for printing characters corresponding to the keys become smaller, and the visibility will be degraded.

SUMMARY

The input device disclosed in the present application is an input device including a plurality of operation units for detecting input signals through an descending-ascending movement of pushed and/or returned operation surfaces. Each of the operation units has an operation surface for accepting an input operation. The operation surface has a rectangular contour comprising a plurality of sides and a plurality of corner portions in a plan view. When a point at which extensions of adjacent two of the plural sides cross each other is defined as a virtual intersection and an intersection of a plurality of diagonals linking the virtual intersections is defined as a virtual center, the contour of the corner portion crosses the diagonal that passes through the virtual intersection and the virtual center, at a position between the virtual intersection in the vicinity of the corner portion and the virtual center. And, at least one of the corner portions is a specific corner portion having an intersection with the diagonal at a position closer to the virtual center than the adjacent two corner portions.

BRIEF DESCRIPTION OF THE DRAWINGS

FIG. 2B is a side view showing the keyboard of the notebook PC.

DETAILED DESCRIPTION OF THE INVENTION

Hereinafter, the present invention will be described by way of illustrative embodiments with reference to the drawings. It should be noted that the dimensions of the components in the respective drawings do not express the actual dimensions of the components and the dimensional ratio or the like. As an example of the input device in the embodiment, a keyboard of a notebook PC will be described below. The present embodiment is not limited to the keyboard of a notebook PC as the example of input device but it can be a keyboard packaged in a desktop PC or a keyboard externally connectable to PC or PDA (personal digital assistance). Further, the keyboards in the present embodiment include a keyboard having QWERTY layout for example, and a keyboard capable of inputting only numerical figures and arithmetic signs.

(Embodiment 1)

[1. Configuration of Notebook PC]

Figure 1:
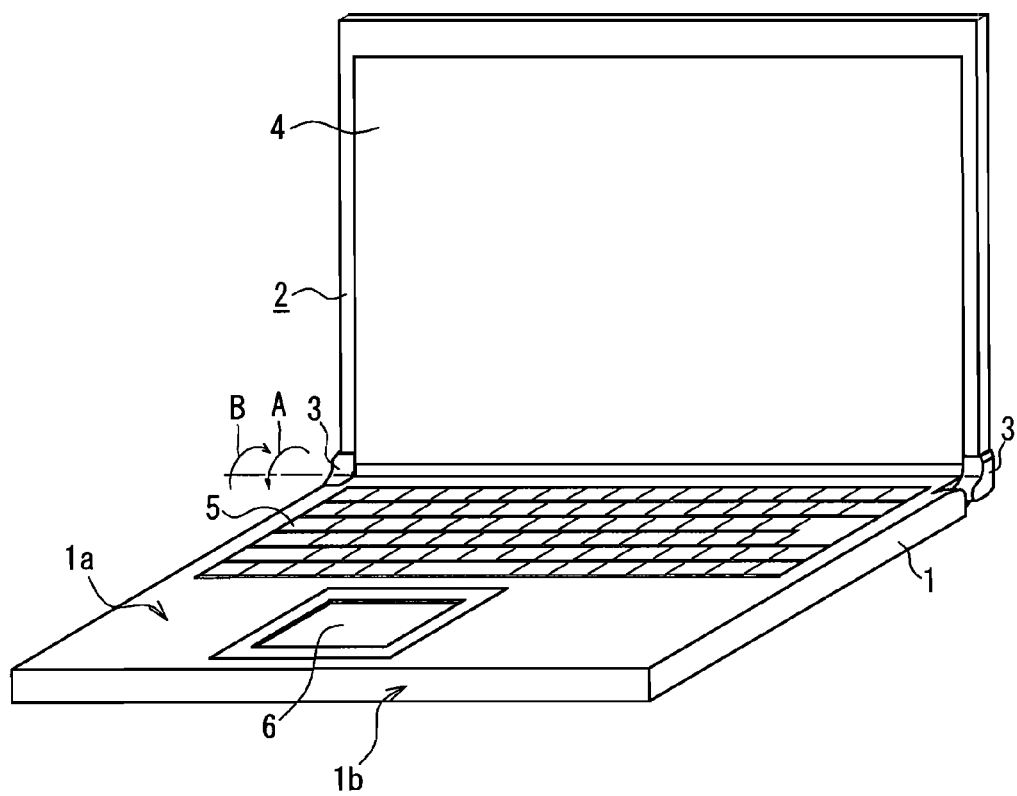
FIG. 1 is a perspective view showing a notebook personal computer (hereinafter, abbreviated as notebook PC).

FIG. 1 is a perspective view showing an appearance of a notebook PC according to the present embodiment. As shown in FIG. 1, the notebook PC has a first housing 1 and a second housing 2. The first housing 1 includes a circuit board on which various electric elements are mounted, a hard disk drive and the like. The second housing 2 has a display panel 4. The first housing 1 and the second housing 2 are supported rotatably relative to each other in directions indicated with an arrow A or an arrow B by hinge portions 3. Each of the hinge portion 3 has a shaft that supports rotatably the first housing 1 and the second housing 2.

On the upper face 1a of the first housing 1, a keyboard 5 and a pointing device 6 are disposed. For example, a user who uses the notebook PC faces a front side 1b of the first housing 1, and at this position he operates the keyboard 5 or the pointing device 6 with his hands. The keyboard 5 accepts operations of inputting various characters by the user. The pointing device 6 is a device that is capable of accepting the contact operations by the user on the operation surface and moving the cursor displayed on the display panel 4 to a target position. In this context, personal pronouns such as "he" are used for "user" only for convenience, although the user actually may be male or female.

[2. Configuration of Keyboard]

Figure 2A:
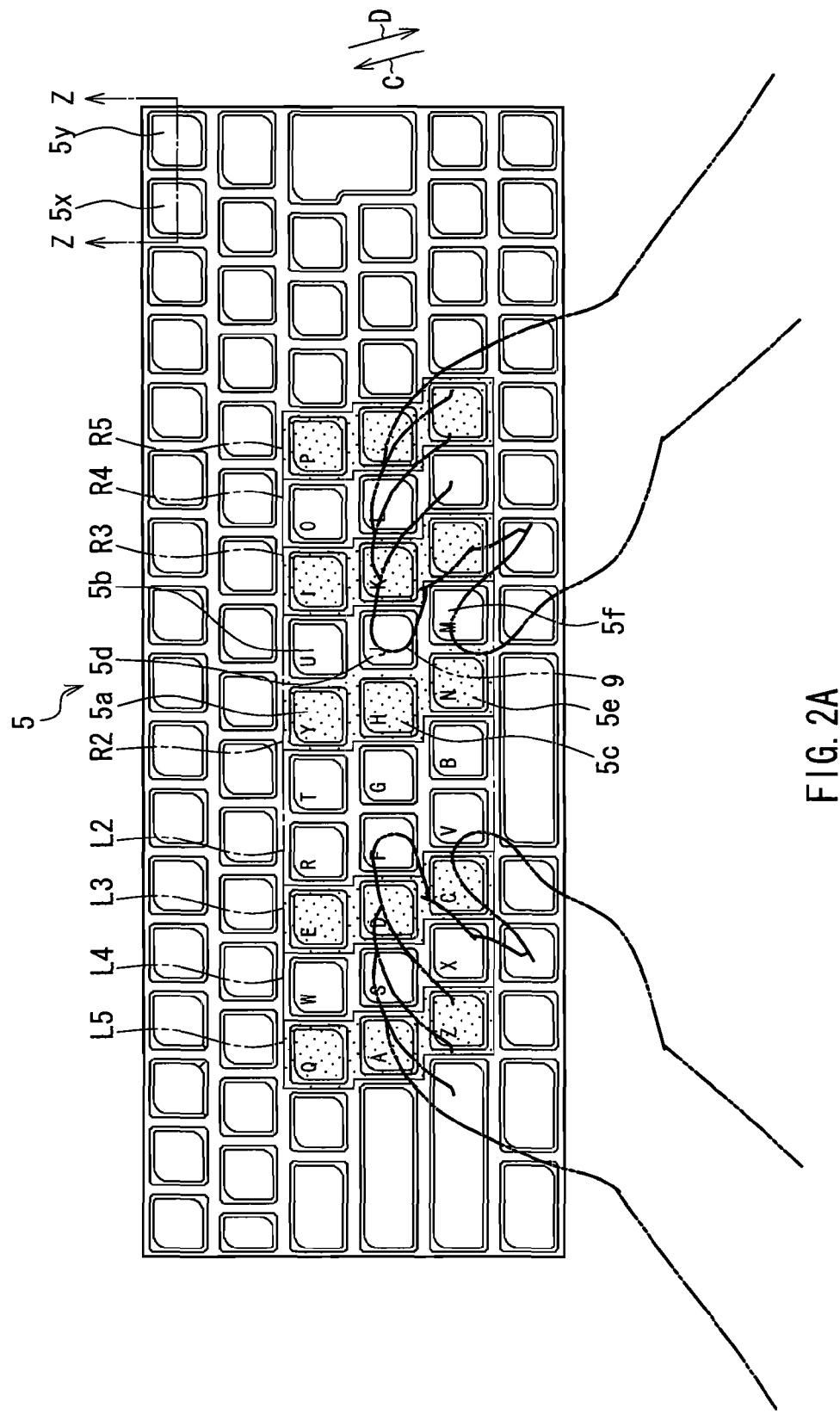
FIG. 2A is a plan view showing a keyboard of the notebook PC.

FIG. 2A is a plan view of the keyboard in the notebook PC as shown in FIG. 1. As shown in FIG. 2A, the keyboard 5 has a plurality of keys, and the respective keys are assigned with inputtable characters and functions. For example, on the operation surface of key top of each of the keys (operation portions) of the keyboard 5 (operation surface to be pushed with the finger at the time the user inputs characters and the like with the keyboard 5), the alphabet letters according to the QWERTY layout are shown. Here, keys responsible for characters other than alphabet letters are not shown. The key layout of the keyboard 5 is not limited to the QWERTY layout in the present embodiment, but any other key layout such as AZERTY layout or Dvorak layout can be employed.

[3. Explanation on Touch Typing]

Touch typing is typing in which a user conducts key input without looking at the characters and the like printed on the operation surfaces of key tops. In touch typing, the key input starts from the state where the user placed his fingers on the respective home positions. The state where the fingers are placed on the respective home positions is shown in FIG. 2A for example. The second finger of the left hand (left index finger) is placed on the "F" key, the third finger of the left hand (left middle finger) is placed on the "D" key, the fourth finger of the left hand (left ring finger) is placed on the "S" key, and the fifth finger of the left hand (left little finger) is placed on the "A" key. At the same time, the second finger of the right hand (right index finger) is placed on the "J" key, the third finger of the right hand (right middle finger) is placed on the "K" key, the fourth finger of the right hand (right ring finger) is placed on the "L" key, and the fifth finger of the right hand (right little finger) is placed on the ";" key.

The respective keys are arranged at positions convenient for conducting input operations with the respective fingers assigned to key input. For example, the respective keys for the region L2 in FIG. 2A are arranged at positions convenient for inputting with the left second finger responsible for input of this region. Similarly, the respective keys for the regions L3 (hatched), L4, and L5 (hatched) in FIG. 2A are arranged at positions convenient for inputting with the left third finger, the left fourth finger and the left fifth finger responsible for inputting of these regions. Further, respective keys for the regions R2 (hatched), R3, R4 (hatched) and R5 in FIG. 2A are arranged at positions convenient for inputting with the right second finger, the right third finger, the right fourth finger and the right fifth finger responsible for input of these regions. Here, the regions L3, L5, R2 and R4 are hatched for distinguishing these regions from other regions, but they do not indicate the actual specifications of the keyboard 5.

In touch typing, in principle, the respective fingers are moved from their home positions in the upper-left direction (direction indicated with an arrow C) or in the lower-right direction (direction indicated with an arrow D). For example, in a case where the user conducting key input intends to input the "U" key 5b, he moves his right second finger 9 from the surface of the "J" key 5d as the home position in the direction indicated with the arrow C and pushes down the target key. Similarly, in a case of inputting the "M" key 5f, he moves his right second finger 9 from the surface of the "J" key 5d as the home position in the direction indicated with the arrow D and pushes down the target key.

FIG. 2B is a side view showing the keyboard of FIG. 2A. In FIG. 2B, the left hand is not illustrated and only the right hand is shown with an alternate long and two short dashes line. In a case of moving fingers in touch typing, the user may slide his fingers while making the fingers contact with the operation surfaces of the respective keys. In this case, the fingers may contact with the outer periphery portions of the operation surfaces of keys positioned in the moving direction.

For example, as shown in FIG. 2B, when the right second finger 9 is slid toward a key positioned upward the home position, the right second finger 9 contacts with the outer periphery portion 61 of the operation surface 51a. By sliding the fingers in this manner, the user can recognize the key positions due to the contact sense of his fingers. However, when the contact sense of the outer periphery portion 61 to the finger is too strong, the user who operates the keyboard 5 will feel discomfort. Hereinafter, a configuration of keyboard to prevent such discomfort will be explained.

[4. Configuration of Key Tops]

Figure 3:
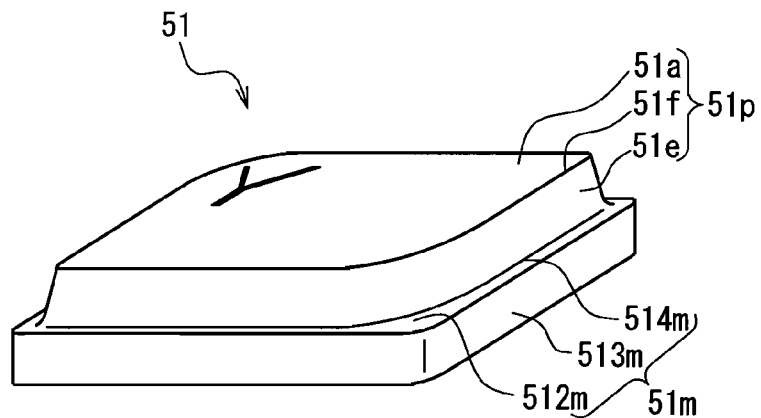
FIG. 3 is a perspective view showing a key top.

FIG. 3 is a perspective view showing a key top 51 composing each key on the keyboard 5. As shown in FIG. 3, the key top 51 is shaped to have a protruding portion 51p on a base portion 51m. On the protruding portion 51p, an operation surface 51a for accepting a pushing operation by the user and a side face 51e consecutively extending downward (push-down direction) from the operation surface 51a are formed, and a boundary portion 51f is formed at the border between the operation surface 51a and the side face 51e. On the base portion 51m, a base upper face 512m extending to the side face 51e and a base side face 513m extending consecutively downward (push-down direction) from the base upper face 512m are formed, and a base boundary portion 514m is formed at the border between the side face 51e and the base upper face 512m.

The operation surface 51a can be shaped arbitrarily. For example, the operation surface 51a may be flat. Alternatively, the operation surface 51a may be shaped as a substantial crater by providing an inclination toward the center of the operation surface 51a. In this case, the operation surface 51a will fit easily the curve of the fingertip pushing the key, thereby improving the operability at the key touch. Further, it is preferable that the boundary portion 51f is formed to have a curved shape, because the fingertip will be unlikely to scratch the boundary portion 51f at the time of inputting a target key by moving or sliding the finger. Further, it is preferable that the base boundary portion 514m at the border between the side face 51e and the base upper face 512m is shaped to have a curved surface. Namely, it is preferable that the boundary portion 514m is shaped to have a gentle curve, since the fingertip will be unlikely to scratch the base boundary portion 514m at the time of inputting a target key by moving or sliding the finger.

Figure 4A:
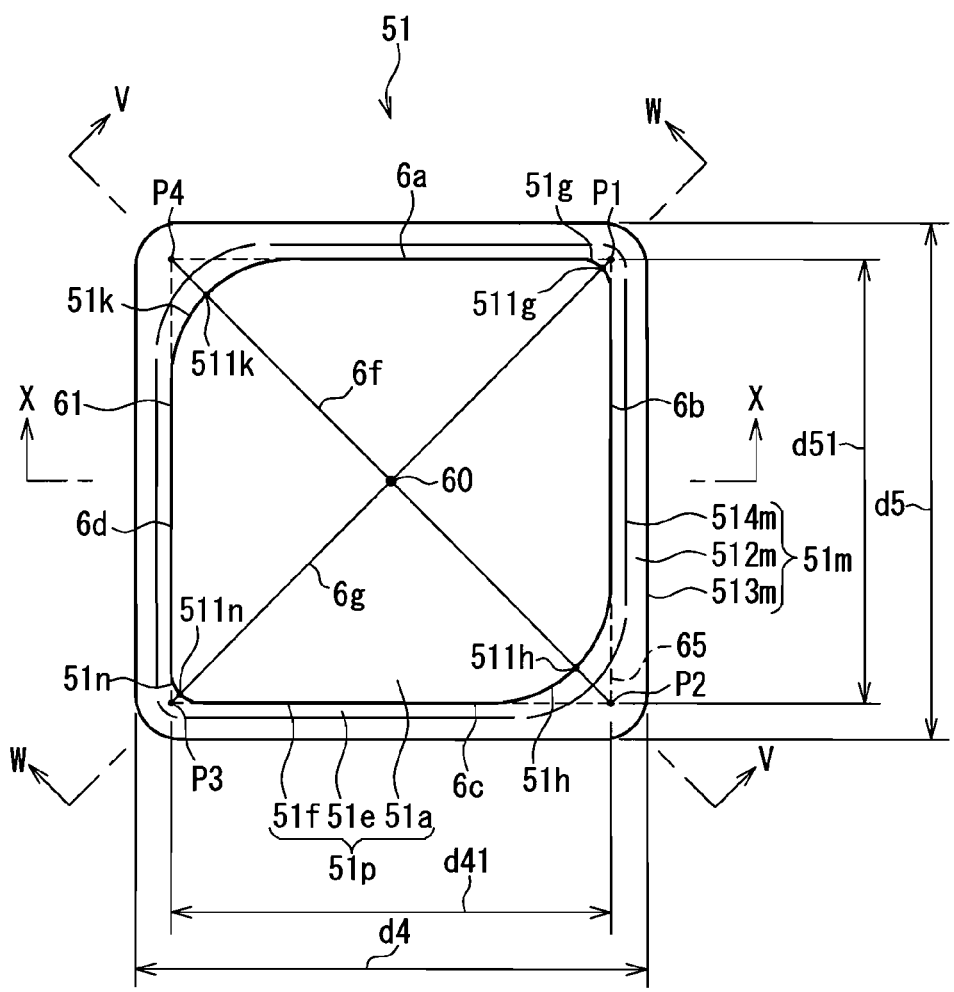
FIG. 4A is a plan view showing a key top.
Figure 4B:
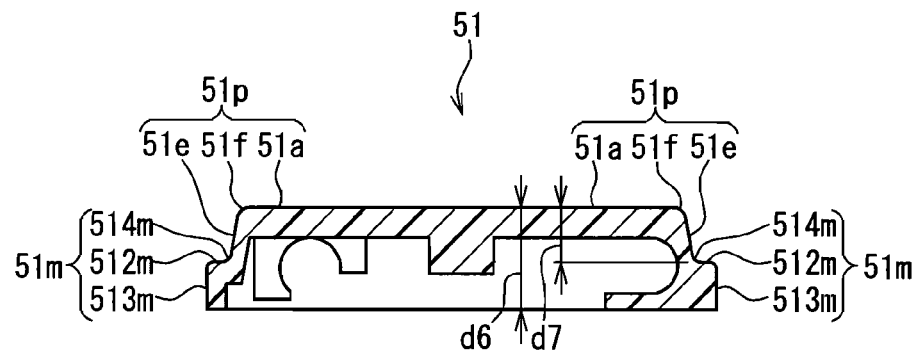
FIG. 4B is a cross-sectional view of the key top.

FIG. 4A is a plan view showing the key top 51 shown in FIG. 3. FIG. 4B is a cross-sectional view taking along a line X-X in FIG. 4A. As shown in FIG. 4A, the outer periphery portion 61 as the contour of the operation surface 51a in a plan view is a substantial rectangle having four sides (side 6a, side 6b, side 6c and side 6d) and four corner portions (corner portion 51g, corner portion 51h, corner portion 51n and corner portion 51k).

In the present embodiment, a corner portion denotes a part to connect the end parts of two adjacent sides. For example, the corner portion 51h as shown in FIG. 4A connects an end part of the side 6b and an end part of the side 6c. Similarly, the corner portion 51n connects an end part of the side 6c and an end part of the side 6d. The corner portion 51k connects an end part of the side 6d and an end part of the side 6a. And, the corner portion 51g connects an end part of the side 6a and an end part of the side 6b.

The corner portion 51g, the corner portion 51h, the corner portion 51n and the corner portion 51k in FIG. 4A are arc-shaped respectively. The corner portions can be shaped arbitrarily. For example, they may be elliptic at the longer axis side or at the shorter axis side. Alternatively, the corner portions may have an obtuse shape.

Further, as shown in FIG. 4A, a side face 51e, a base boundary portion 514m, a base upper face 512m and a base side face 513m are provided respectively, on the periphery of the operation surface 51a. The contour of the base side face 513m in a plan view is shaped as a substantial rectangle having four corner portions. The respective corner portions on the base side face 513m are shaped as arcs having an equivalent curvature.

The curvatures of the respective corner portions on the base side face 513m are determined arbitrarily. For example, the curvature of each corner portion on the base side face 513m may be determined depending on the corner portions of the operation surface 51a provided in the vicinity. Furthermore, the shape of the corner portions on the base side face 513m can be determined arbitrarily. For example, they may be elliptic at the longer axis side or at the shorter axis side. Alternatively, the corner portions on the base side face 513m may be shaped obtuse.

Further, as shown in FIG. 4B, the contour of the cross section of the key top 51 is shaped stepwise with the operation surface 51a, the side face 51e, the base upper face 512m and the base side face 513m. The side face 51e is inclined in this example, but it may be modified to be perpendicular.

In FIG. 4A, the contour of the substantially rectangular operation surface 51a in a plan view is defined by the four sides (side 6a, side 6b, side 6c and side 6d). A point at which the extensions of adjacent two sides 6a and 6b cross each other is determined as a virtual intersection P1. Similarly, points at which the extensions of sides 6b and 6c, sides 6c and 6d, and the sides 6d and 6a cross each other are determined as virtual intersections P2, P3, and P4. Diagonals of a virtual quadrangle 65 virtually determined with these virtual intersections P1-P4 as the apices are determined as a diagonal 6f and a diagonal 6g respectively. And the intersection of the diagonal 6f and the diagonal 6g is determined as a center 60.

The corner portion 51h and the corner portion 51k oppose each other in the respective directions about the diagonal 6f, and they form arcs having an equivalent curvature. The corner portion 51n and the corner portion 51g oppose each other in the respective directions about the diagonal 6g, and they form arcs having an equivalent curvature. In the present embodiment, the corner portions 51h and 51k have the smallest curvature. The four corner portions of the base side face 513m in a plan view have the second smallest curvature, and the corner portions 51n and 51g have the largest curvature (namely, the radius of curvature is decreased in this order). Alternatively, the corners 51h and 51k may have an equivalent curvature, and the corners 51n and 51g may have an equivalent curvature.

The length of the arcs of the corner portions 51h and 51k is greater than the length of the arcs of the corner portions 51n and 51g. At this time, the curved surface shape of the side face 51e connected to the corner portions 51h and 51k is different from the curved surface shape of the side face 51e connected to the corner portions 51n and 51g. Specifically, the curved surface shape of the side face 51e connected to the corner portions 51h and 51k is chamfered to have a chamfer dimension larger than that of the side face 51e connected to the corner portions 51n and 51g.

Figure 5A:
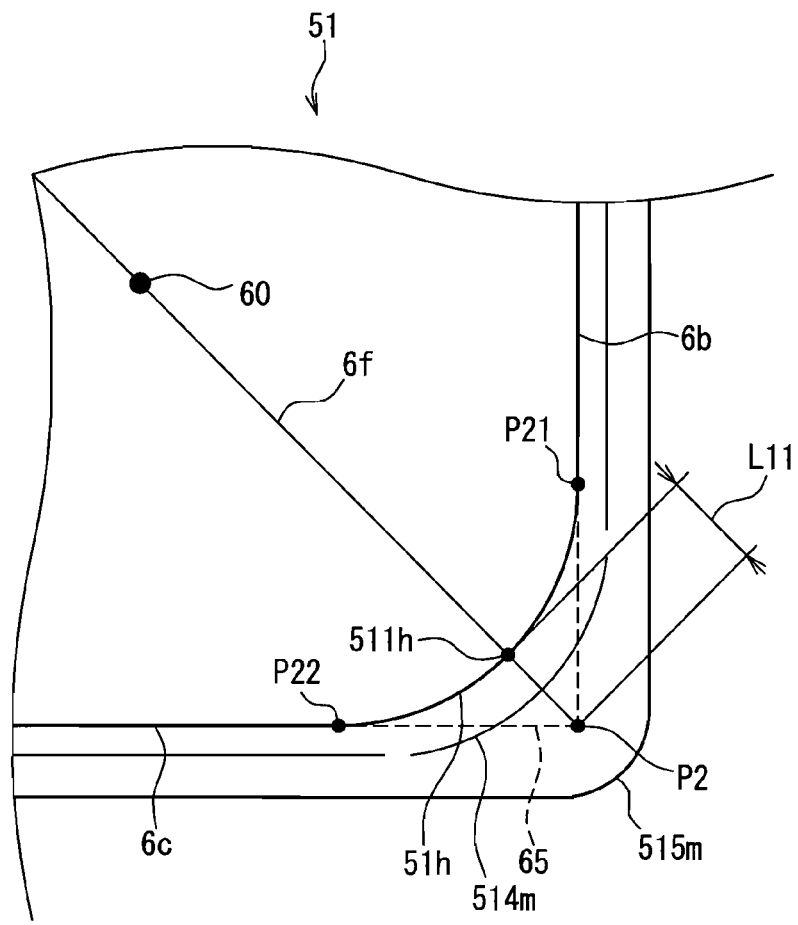
FIG. 5A is a partial magnified view showing a corner portion 51*h* and the vicinity in FIG. 4A.

FIG. 5A is a partial magnified view showing the corner portion 51h and its vicinity as shown in FIG. 4A. A node between the side 6b and the corner portion 51h is determined as P21. A node between the side 6c and the corner portion 51h is determined as P22. A point at which the diagonal 6f and the corner portion 51h cross each other is determined as an intersection 511h. Namely, between the center 60 and the virtual intersection P2, the contour of the corner portion 51h will cross the diagonal 6f that passes through the center 60 and the virtual intersection P2.

At this time, the linear distance between the intersection 511h and the virtual intersection P2 is determined as L11. In a case where the center of circle in the arc of the corner portion 51*h* is present on the diagonal 6*f*, the intersection 511*h* corresponds to the apex of an arc passing through P21 and P22. In this case, the distance L11 is defined as the shortest distance between the virtual intersection P2 and the corner portion 51*h*. In the present embodiment, the corner portion 51*h* and the corner portion 51*k* are determined as specific corner portions.

Figure 5B:
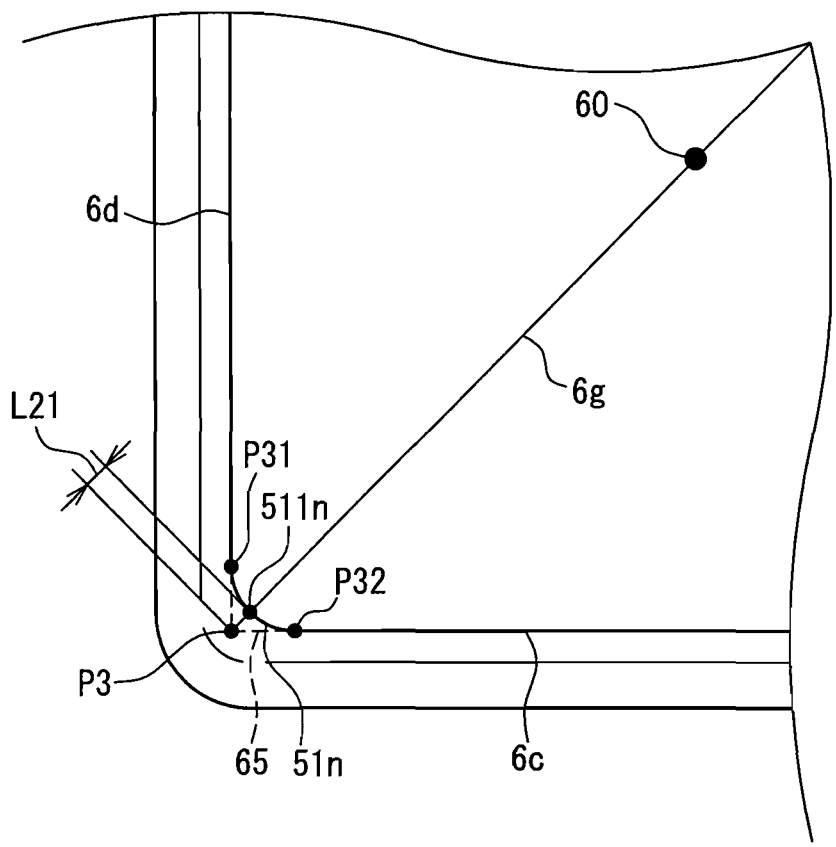
FIG. 5B is a partial magnified view showing a corner portion 51*n* and the vicinity in FIG. 4A.

FIG. 5B is a partial magnified view showing the corner portion 51*n* and the vicinity as shown in FIG. 4A. A node between the side 6*d* and the corner portion 51*n* is determined as P31. A node between the side 6*c* and the corner portion 51*n* is determined as P32. A point at which the diagonal 6*g* and the corner portion 51*n* cross each other is determined as an intersection 511*n*. Namely, on a line segment linking the center 60 and the virtual intersection P3, the contour of the corner portion 51*n* will cross the diagonal 6*g* that passes through the center 60 and the virtual intersection P3.

At this time, the linear distance between the intersection 511*n* and the virtual intersection P3 is determined as L21. In a case where the center of circle in the arc of the corner portion 51*n* is present on the diagonal 6*g*, the intersection 511*n* corresponds to the apex of arc passing through P31 and P32. In this case, the distance L21 is defined as the shortest distance between the virtual intersection P3 and the corner portion 51*n*.

As mentioned above, the corner portion 51*h* as a specific corner portion has an longer arc than that of the corner portion 51*n* that is other than the specific corner portion. At this time, the intersection 511*h* of the corner portion 51*h* is closer to the center 60 than the intersection 511*n* of the corner portion 51*n*. In contrast, the intersection 511*n* of the corner portion 51*n* is farther from the center 60 than the intersection 511*h* of the corner portion 51*h*. Therefore, the distance L11 as the linear distance between the intersection 511*h* and the virtual intersection P2 is greater than the distance L21 as the linear distance between the intersection 511*n* and the virtual intersection P3.

Here, as the arc shape of the corner portion 51*h* and the corner portion 51*k* have an equivalent curvature, the linear distance between the intersection 511*k* and the virtual intersection P4 is equal to the distance L11. As the arc shape of the corner portion 51*n* and the corner portion 51*g* have an equivalent curvature, the linear distance between the intersection 511*g* and the virtual intersection P1 is equal to the distance L21. Further, the corner portions (corner portion 51*n* and corner portion 51*g*) other than the specific corner portions can be shaped arbitrarily. For example, a corner portion other than the specific corner portion can be shaped to be right-angled.

Figure 6A:
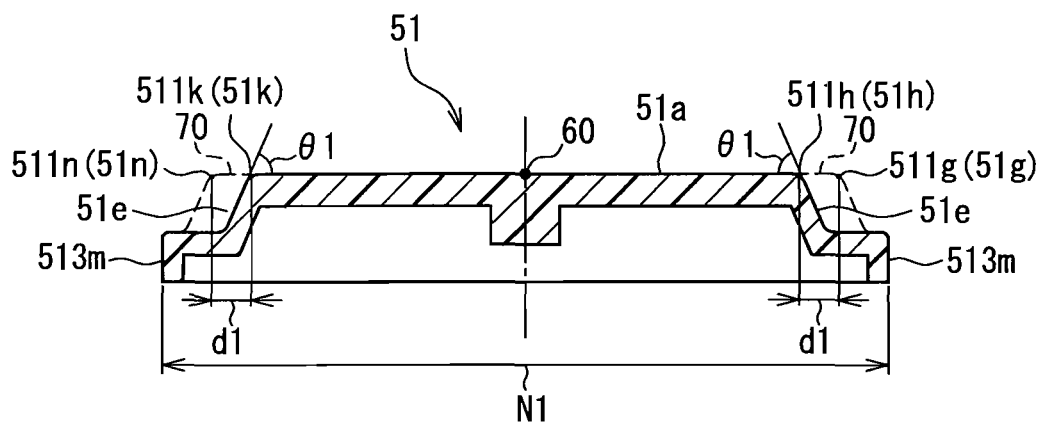
FIG. 6A is a cross-sectional view taken along a line V-V in FIG. 4A.
Figure 6B:
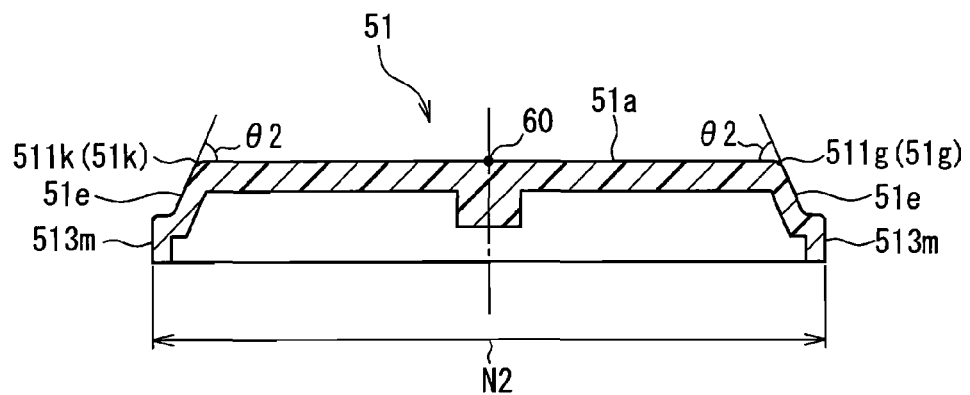
FIG. 6B is a cross-sectional view taken along a line W-W in FIG. 4A.

FIG. 6A is a schematic cross-sectional view taken along a V-V line in FIG. 4A. FIG. 6B is a schematic cross-sectional view taken along a line W-W in FIG. 4A. In FIGS. 6A and 6B, a link support portion or the like is not shown but only the main components of the key top 51 are shown schematically.

Since the four corner portions in the plan view of the base side face 513*m* as shown in FIG. 4A are arc-shaped to have an equivalent curvature, the width N1 in the diagonal direction as shown in FIG. 6A and the width N2 in the diagonal direction as shown in FIG. 6B are equal. A broken line 70 indicates the difference between FIG. 6A and FIG. 6B in a case where FIG. 6B is overlapped with FIG. 6A by coinciding the center 60 and the rotational angle about the center 60. As shown in FIG. 6A, the intersection 511*h* of the corner portion 51*h* is located closer to the center 60 by d1 than the intersection 511*g* of the corner portion 51*g*.

The tilt angle θ1 of the side face 51*e* defined by the operation surface 51*a* and a plane parallel to the side face 51*e* extending downward from the corner portion 51*h* shown in FIG. 6A is determined substantially equal to the tilt angle θ2 of the side face 51*e* defined by the operation surface 51*a* and a plane parallel to the side face 51*e* extending downward from the corner portion 51*g* shown in FIG. 6B. Alternatively, the tilt angle θ1 can be made smaller than the tilt angle θ2 so that the side face 51*e* of either the corner portion 51*h* or the corner portion 51*k* will be less steep than the side face 51*e* of either the corner portion 51*n* or the corner portion 51*g*. Namely, the tilt angle of the side face 51*e* is determined arbitrarily. Similarly, the cross section shape of the side face 51*e* is determined arbitrarily.

As mentioned above, the corner portion 51*h* as a specific corner portion is formed to have a longer arc than that of the corner portion 51*n* other than a specific corner portion, and the corner portion 51*h* is formed at a position closer to the center 60 than the corner portion 51*n*. Thereby the curved surface shape of the side face 51*e* extending from the corner portion 51*h* can be chamfered to have a chamfer dimension larger than that of the curved surface shape of the side face 51*e* extending from the corner portion 51*n*.

As a result, when making a finger slide to contact with the outer periphery portion of the operation surface of a key as a destination during a touch typing, the finger will be unlikely to scratch the corner portion of the key top. In particular, in a case of application to touch typing during which the fingers often move in the upper-left or lower-right direction, it is more effective to form specific corner portions on the upper-left or lower-right corner of the operation surface 51*a* of the key top 51 rather than the upper-right or lower-left corner thereof. This will be described specifically below.

[5. Internal Structure of Key]

Figure 7A:
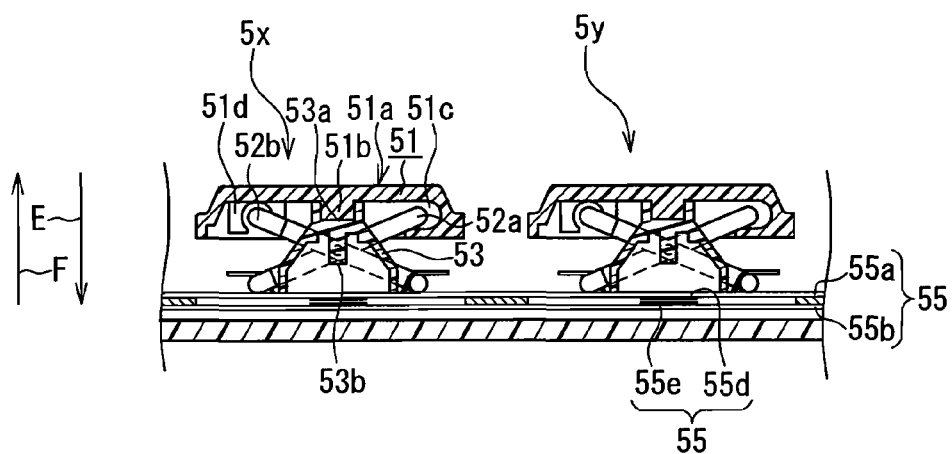
FIG. 7A is a cross-sectional view taken along a line Z-Z in FIG. 4A.

FIG. 7A is a cross-sectional view taken along the line Z-Z of the keys 5*x* and 5*y* in FIG. 2A. In the following description on the specific configuration of the keyboard 5, the key 5*x* is referred to as an example. The respective keys arranged on the keyboard 5 have a common internal structure. Hereinafter, a keyboard 5 employing a membrane switch for the key switch mechanism will be explained, but the key switch mechanism will not be limited to this example. For example, the keyboard may employ a mechanical switch or a capacitance contactless switch.

The key 5*x* is formed of a key top 51, link members 52*a* and 52*b*, and a dome portion 53. On the bottom (backside of the operation surface 51*a*) of the key top 51, a protruding portion 51*b* is formed at the substantial center, and link support portions 51*c* and 51*d* are formed on the both sides of the protruding portion 51*b*.

Figure 7B:
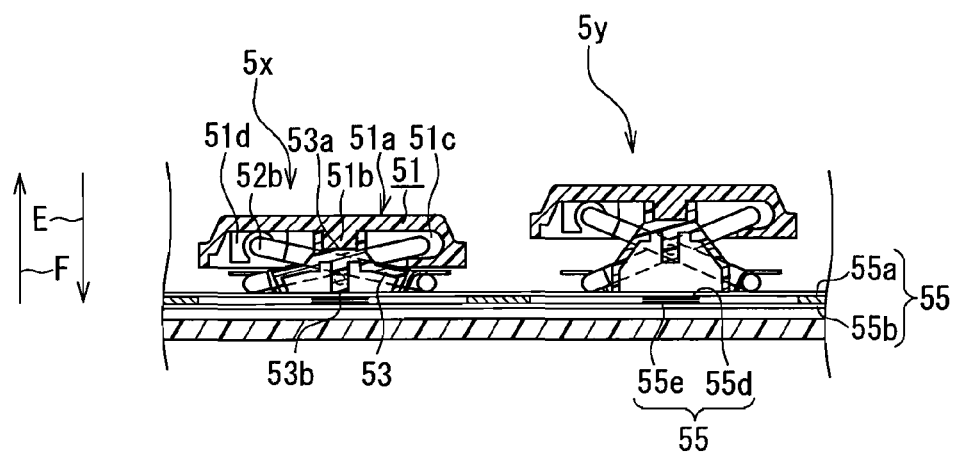
FIG. 7B is a cross-sectional view of a keyboard for showing a state where a key is pushed.

FIG. 7A shows a state where the key top 51 is not pushed down. When a user pushes the key top 51 with his finger or the like in this state in a direction indicated with an arrow E, the key top 51 is displaced and descends in the direction indicated with the arrow E, and the dome portion 53 is compressed and deformed by the pushing force in the direction indicated with the arrow E. As shown in FIG. 7B, when the key top 51 is pushed by the user to a predetermined position, the protruding portion 53*b* formed in the dome portion 53 pushes an upper membrane sheet 55*a*, and the upper membrane sheet 55*a* is bent and deformed in the direction indicated with the arrow E. When the upper membrane sheet 55*a* is deformed to a predetermined position, an upper contact point 55*d* and a lower contact point 55*e* contact with each other. Thereby a wiring pattern formed on the upper membrane sheet 55*a* and a wiring pattern formed on a lower membrane sheet 55*b* are connected electrically, and thus an electrically ON state can be obtained. Since the wiring patterns are connected electrically to a signal-processing circuit arranged in the first housing 1 (as the connected state is well known, it is not shown here), the signal-processing circuit executes a signal processing corresponding to the pushed key. For example, in a case where the pushed key is assigned with a function of inputting a predetermined character, a control is carried out so that a character shown on the operation surface 51*a* will be displayed on the display unit 4 arranged on the second housing 2.

In the state as shown in FIG. 7B, when the user lets his finger off from the key top 51, the key top 51 lifts due to the resilience of the dome portion 53 in a direction indicated with an arrow F so as to return to the original position. Since the dome portion 53 is recovered from the compressed and deformed state to the original state, the protruding portion 53*b* that has pushed the upper membrane sheet 55*a* separates from the upper membrane sheet 55*a*. Thereby the upper contact point 55*d* and the lower contact point 55*e* are separated from each other. Since the upper contact point 55*d* and the lower contact point 55*e* are isolated from each other in this manner, the wiring pattern of the upper membrane sheet 55*a* and the wiring pattern of the lower membrane sheet 55*b* are separated from each other so as to provide an electrically OFF state.

In this manner, at each key (operation portion), an input signal is detected due to the descending-ascending move of the pushed and returned key top 51.

[6. Various Examples of Use]

[6-1. Example of Use 1]

Figure 8A:
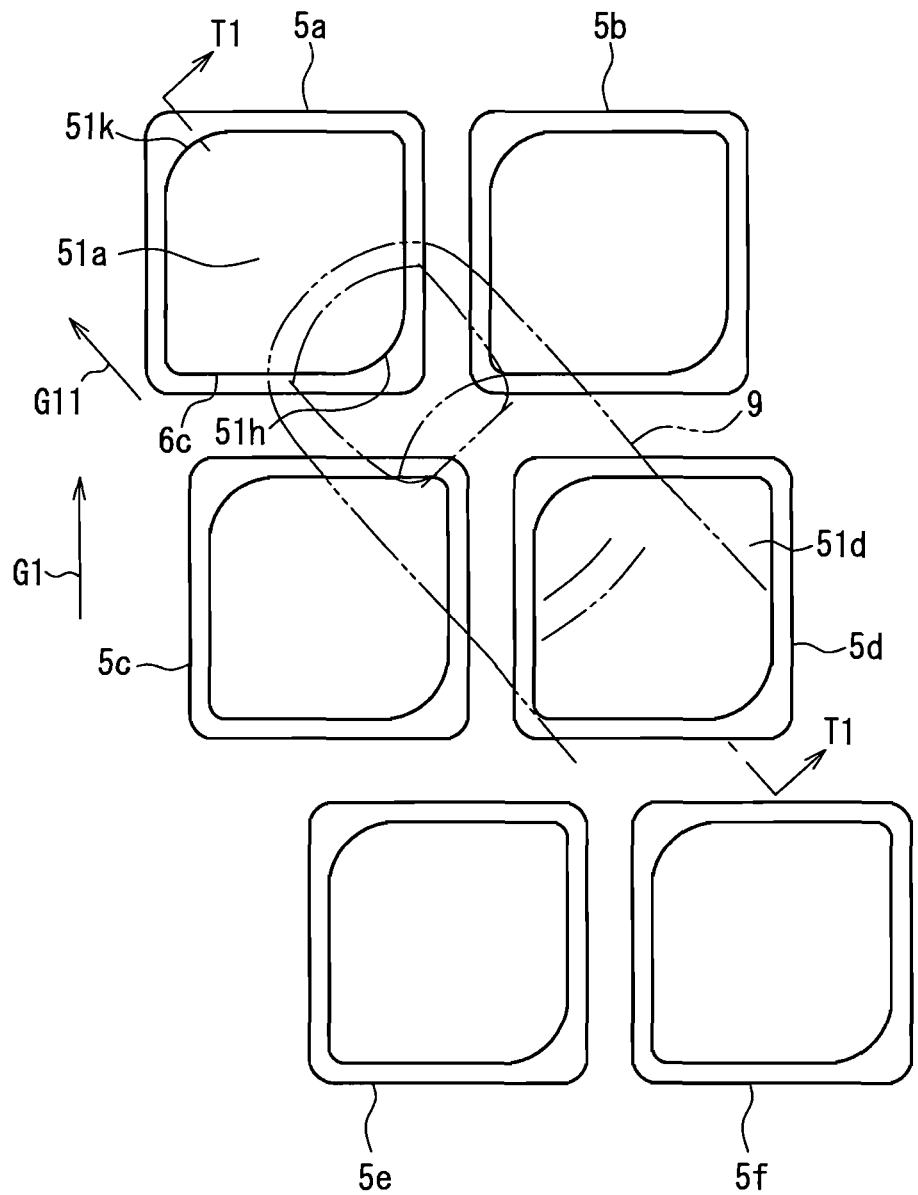
FIG. 8A is a partial magnified view showing a region R2 in FIG. 2.
Figure 8B:
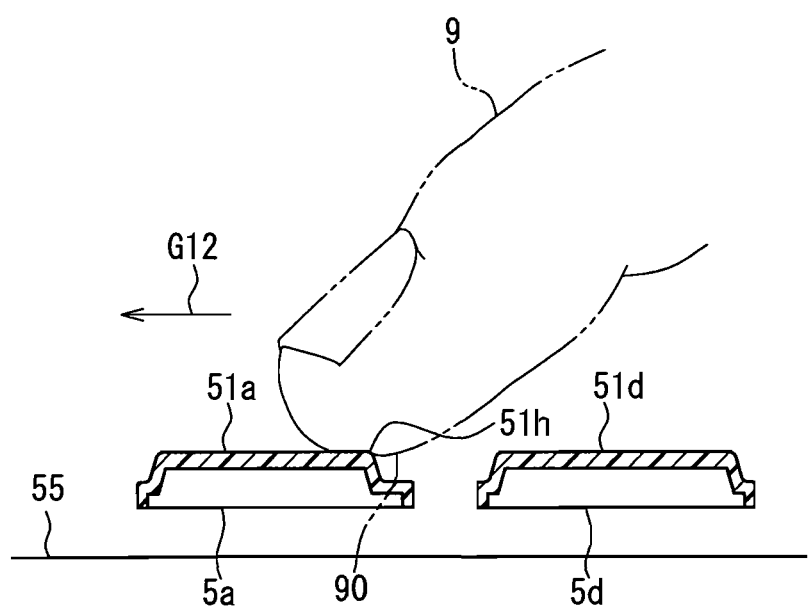
FIG. 8B is a cross-sectional view showing a state where a finger is slid in contact with an operation surface.

FIG. 8A is a partial magnified view showing a state at the time of key-input of the keyboard 5 in this Example of use. FIG. 8B is a schematic cross-sectional view taken along a line T1-T1 in FIG. 8A. Members or components common with those mentioned above are assigned with the same reference numbers for avoiding duplicated explanation.

In FIG. 8A, the respective key tops 51 of the keys 5*a*-5*f* are arranged so that one side of the substantial rectangle of the operation surface 51*a* shown in FIG. 4A will oppose the user (operator). For example, the side 6*c* of the key 5*a* as shown in FIG. 8A opposes the user who faces a direction indicated with an arrow G1 during use of the keyboard 5.

The corner portion 51*k* and the corner portion 51*h*, both of which are specific corners, are formed at the upper-left corner and the lower-right corner of the operation surface 51*a* of the key 5*a* when viewed by the user of the keyboard 5. Similarly, regarding the other keys (5*b*-5*d*), specific corners are formed respectively at the upper-left corners and the lower-right corners of the operation surfaces of the key tops 51.

FIG. 8A shows a state where a finger 9 (indicated with an alternate long and two short dashes line) of the user is slid (moved in parallel with the keyboard surface) from a state being in contact with the operation surface 51*d* of the key 5*d* as a home position key in a direction indicated with an arrow G11, in order to push down the operation surface 51*a* of the key 5*a* as the target key. Namely, in this state, the finger 9 has not yet pushed down the key 5*a*.

In FIG. 8B, when the finger 9 in contact with the operation surface 51*d* of the key 5*d* is slid to the operation surface 51*a* of the key 5*a* arranged adjacent in the direction indicated with an arrow G12, a fingertip 90 may contact with the corner portion 51*h*.

As mentioned above, the corner portion 51*h* shown in FIG. 8A is formed as a specific corner having a larger arc in comparison with the other corner portions. Therefore, when the fingertip 90 contacts with the corner portion 51*h*, the contact area between the fingertip 90 and the corner portion 51*h* can be increased. By increasing the contact area between the fingertip 90 and the corner portion 51*h*, the pressure generated at the fingertip 90 in contact with the corner 90 can be dispersed. Therefore, the user is unlikely to feel discomfort at the fingertip 90 in contact with the corner 90.

In a case where the boundary portion 51*f* (shown in FIG. 3) between the operation surface 51*a* and the side face 51*e* is chamfered to have a curved surface, the contact area between the fingertip 90 and the corner portion 51*h* can be increased further, and it is advantageous. Similarly, in a case where the side face 51*e* is formed as a gently inclined face, the contact area between the fingertip 90 and the corner portion 51*h* can be increased further, and it is advantageous.

Figure 9A:
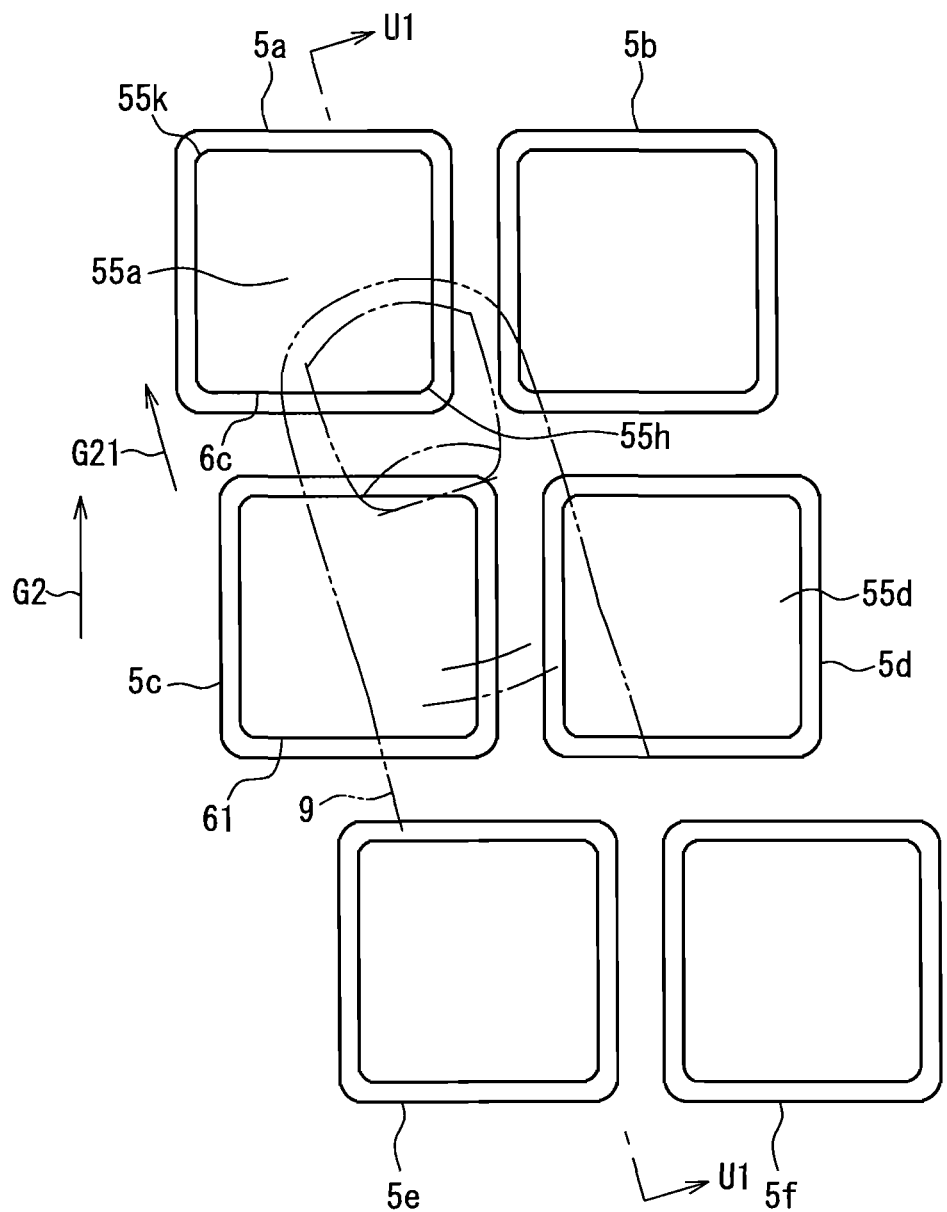
FIG. 9A is a partial magnified view showing a region R2 in a comparative example.
Figure 9B:
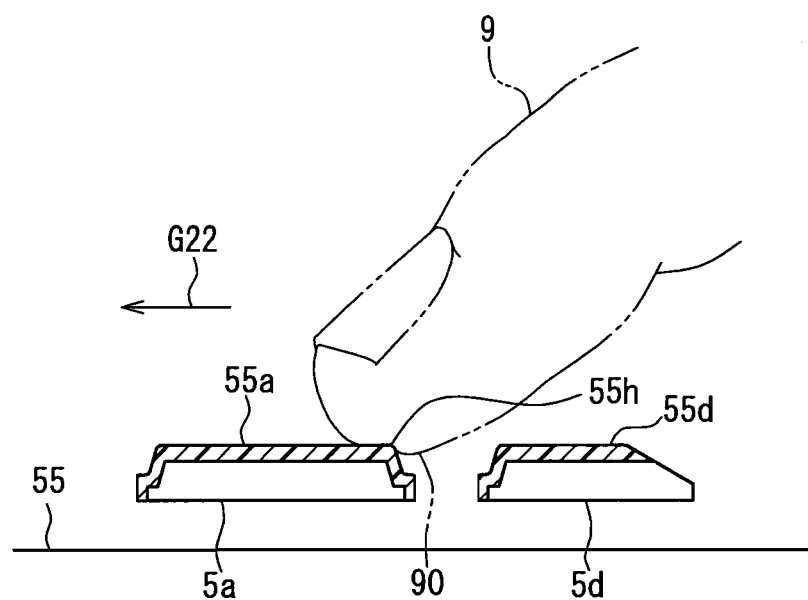
FIG. 9B is a cross-sectional view showing a state where a finger is slid in contact with an operation surface.

Next, a comparative example to the present example of use will be explained. FIG. 9A is a partial magnified view showing the state at the time of key input of the keyboard 5 in the comparative example to the present example of use. FIG. 9B is a schematic cross-sectional view taken along a line U1-U1 in FIG. 9A.

In FIG. 9A, the key tops 51 of the respective keys 5*a*-5*f* are arranged so that sides 6*c* of the substantial rectangles on the operation surfaces 51*a* shown in FIG. 4A oppose the user who faces a direction indicated with an arrow G2 during use of the keyboard 5, similarly to FIG. 8A. However, in FIG. 8B in comparison with FIG. 8A, no specific corner portions are formed at the upper-left corner and the lower-right corner of the operation surface 55*a* of the key 5*a* when viewed by the user of the keyboard 5. Similarly, regarding the other keys (5*b*-5*d*), no specific corner portions are formed on the operation surfaces 55*a* of the key tops 51.

FIG. 9A shows a state where a finger 9 (indicated with an alternate long and two short dashes line) of the user is slid (moved in parallel with the keyboard surface) from a state being in contact with the operation surface 55*d* of the key 5*d* as a home position key in a direction indicated with an arrow G21, in order to push down the operation surface 51*a* of the key 5*a* as the target key. Namely, in this state, the finger 9 has not yet pushed down the key 5*a*.

In FIG. 9B, when the finger 9 in contact with the operation surface 51*d* of the key 5*d* is slid to the operation surface 51*a* of the key 5*a* arranged adjacent in the direction indicated with an arrow G22, a fingertip 90 may contact with the corner portion 55*h*.

As mentioned above, the corner portion 55*h* shown in FIG. 9A is not formed as a specific corner having a larger arc in comparison with the other corner portions. Therefore, in a case where the fingertip 90 contacts with the corner portion 55*h*, the contact area between the fingertip 90 and the corner portion 55*h* cannot be increased in comparison with the above-mentioned case as shown in FIG. 8A. As a result, it is impossible to disperse the pressure applied to the fingertip 90 in contact with the corner portion 55*h*. For example, in FIG. 9B, the fingertip 90 is pressed more by the corner portion 55*h* in comparison with the case as shown in FIG. 8A. As a result, the user is more likely to feel discomfort at the fingertip 90 in contact with the corner portion 55*h*.

[6-2. Example of use 2]

Figure 10A:
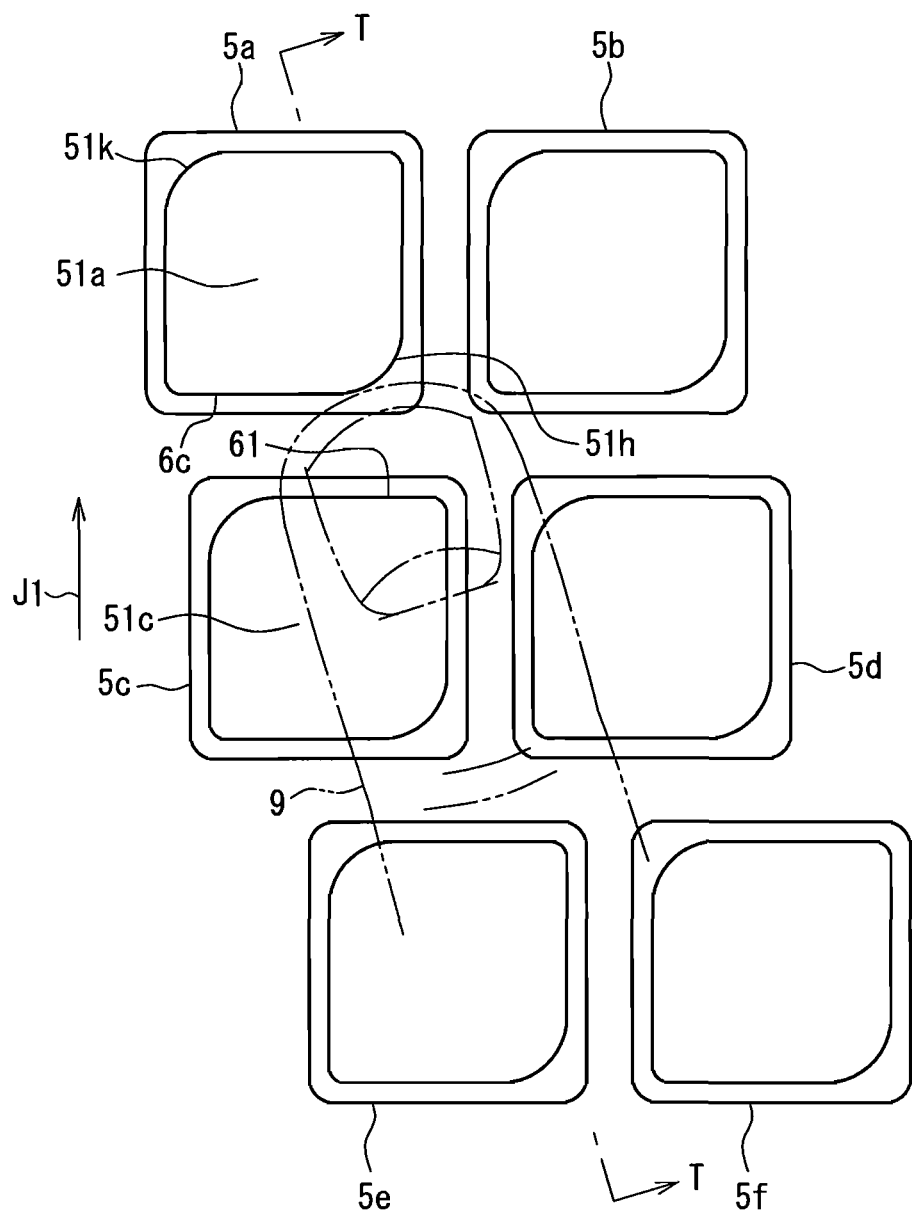
FIG. 10A is a partial magnified view showing a region R2 in FIG. 2.
Figure 10B:
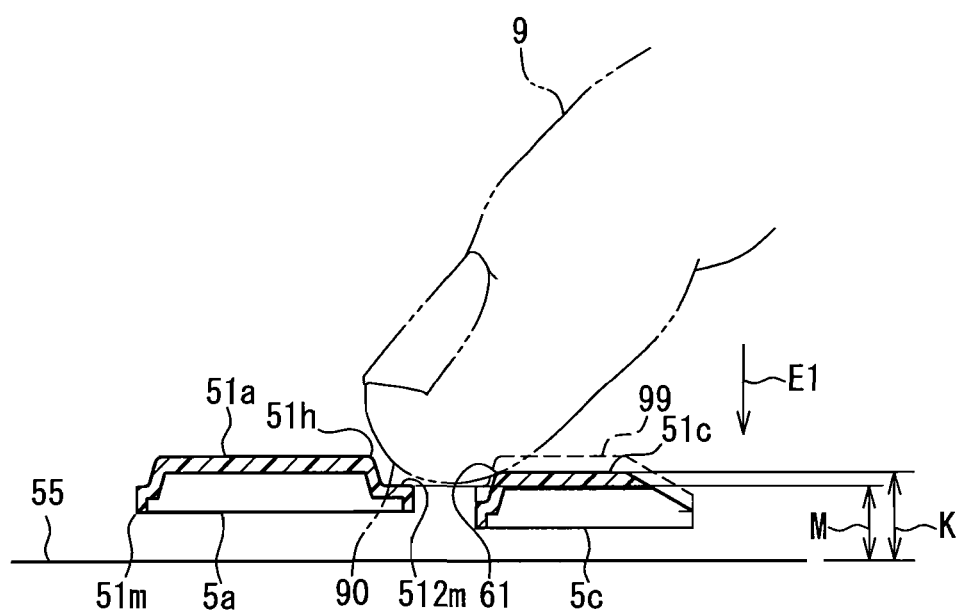
FIG. 10B is a cross-sectional view showing a state where a key is pushed.

FIG. 10A is a partial magnified view showing a state at the time of key-input of the keyboard 5 in this Example of use. FIG. 10B is a schematic cross-sectional view taken along a line T-T in FIG. 10A. Regarding members or components common with those mentioned above are assigned with the same reference numbers for avoiding duplicated explanation.

In FIG. 10A, the respective key tops 51 of the keys 5*a*-5*f* are arranged so that one side of the substantial rectangle of the operation surface 51*a* shown in FIG. 4A will oppose the user (operator). For example, the side 6*c* of the key 5*a* as shown in FIG. 10A opposes the user who faces a direction indicated with an arrow J1 in use of the keyboard 5.

The corner portion 51k and the corner portion 51h, both of which are specific corners, are formed at the upper-left corner and the lower-right corner of the operation surface 51a of the key 5a when viewed by the user of the keyboard 5. Similarly, regarding the other keys (5b-5d), specific corners are formed respectively at the upper-left corners and the lower-right corners of the operation surfaces of the key tops 51.

FIG. 10A shows a state where the upper end part and the vicinity on the operation surface 51c of the key 5c as the target key are pushed down by the finger 9 (indicated with an alternate long and two short dashes line) of the user in the direction indicated with an arrow J1.

In FIG. 10B, the broken line 99 shows a part of the contour of the key top 51 in a state prior to the operation of pushing down the key 5c. In a case of pushing down the operation surface 51c of the key 5c as the target key from the state indicated with the broken line 99, the key top 51 of the key 5c is pushed down in a direction indicated with an arrow E1. At this time, the outer periphery portion 61 of the operation surface 51c of the key 5c is spaced sufficiently from the corner portion 51h of the operation surface 51a of the key 5a as the adjacent key, the operation surface 51a of the key 5a will be unlikely to be pushed together with the operation surface 51c of the key 5c by the fingertip 90 of the user. Therefore, in such a case, an incorrect operation or an incorrect input with respect to the adjacent key 5a is unlikely to occur at the time of inputting the target key 5c.

As shown in FIG. 10B, it is preferable that a distance K between the operation surface 51c and the upper end face of the membrane portion 55 in a state where the key 5c is pushed down to the bottom is greater than a distance M between the base upper face 512m of the key 5a and the upper end face of the membrane portion 55 in a state where the key 5a is not pushed. It can prevent the key top 51 of the key 5a from being pushed due to a contact of the fingertip 90 with the base upper face 512m. Thereby, occurrence of an incorrect input or an incorrect operation with respect to the adjacent key 5a can be prevented more effectively.

Figure 11A:
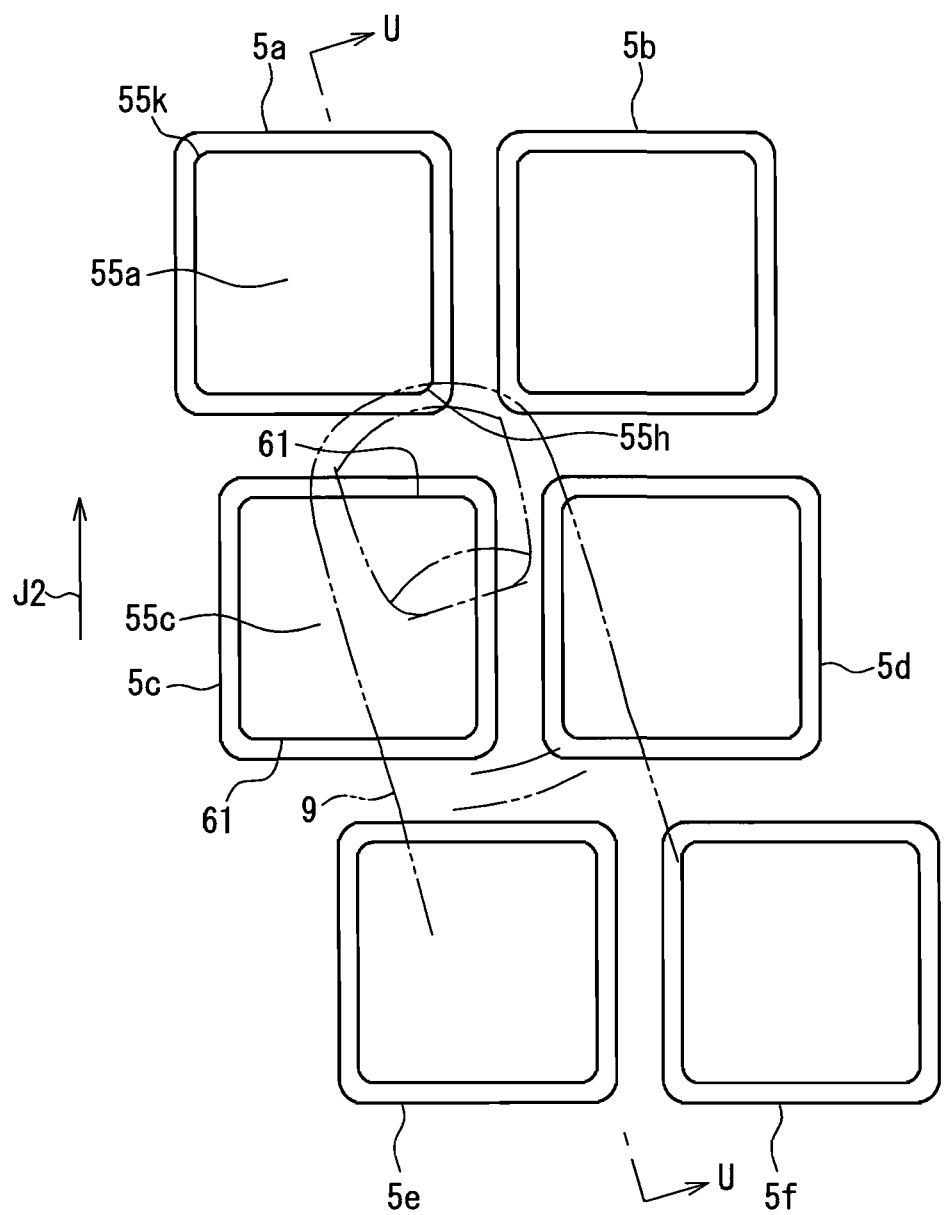
FIG. 11A is a partial magnified view showing a region R2 in a comparative example.
Figure 11B:
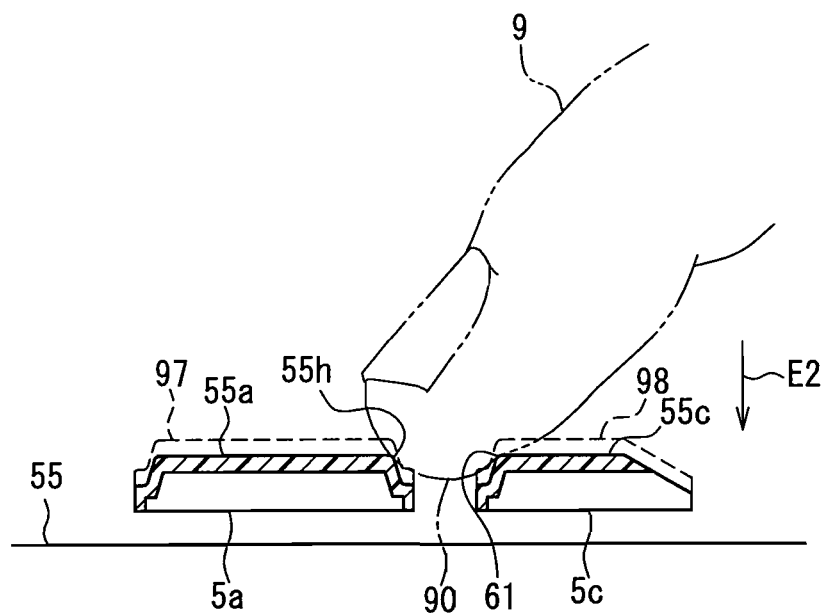
FIG. 11B is a cross-sectional view showing a state where a key is pushed in a comparative example.

Next, a comparative example to the present example of use will be explained. FIG. 11A is a partial magnified view showing the state at the time of key-input of the keyboard 5 in the comparative example to the present example of use. FIG. 11B is a schematic cross-sectional view taken along a line U-U in FIG. 11A.

In FIG. 11A, the key tops 51 of the respective keys 5a-5f are arranged so that sides of the substantial rectangles on the operation surfaces 51a shown in FIG. 4A oppose the user, similarly to FIG. 10A. However, in FIG. 11A in comparison with FIG. 10A, no specific corner portions are formed at the upper-left corner and the lower-right corner of the operation surface 55a of the key 5a when viewed by the user of the keyboard 5. Similarly, regarding the other keys (5b-5d), any specific corner portions are not formed on the operation surfaces 55a of the key tops 51.

FIG. 11A shows a state where the upper end part and the vicinity on the operation surface 55c of the key 5c as the target key are pushed down by the finger 9 (indicated with an alternate long and two short dashes line) of the user in the direction indicated with an arrow J2.

In FIG. 11B, the broken lines 97 and 98 indicate respectively parts of the contours of the key tops 51 in a state prior to the operation of pushing down the keys 5a and 5c respectively. In a case of pushing down the operation surface 51c of the key 5c as the target key from the state indicated with the broken line 98, the key top 51 of the key 5c is pushed down in a direction indicated with an arrow E2. At this time, the outer periphery portion 61 of the operation surface 51c of the key 5c is not spaced sufficiently from the corner portion 55h of the operation surface 51a of the key 5a as the adjacent key in comparison with the case shown in FIG. 10B, and the operation surface 55a of the key 5a is more likely to be pushed together with the operation surface 55c of the key 5c by the fingertip 90 of the user. Therefore, in such a case, an incorrect operation or an incorrect input with respect to the adjacent key 5a will be likely to occur at the time of inputting the target key 5c.

[6-3. Example of Use 3]

Figure 12A:
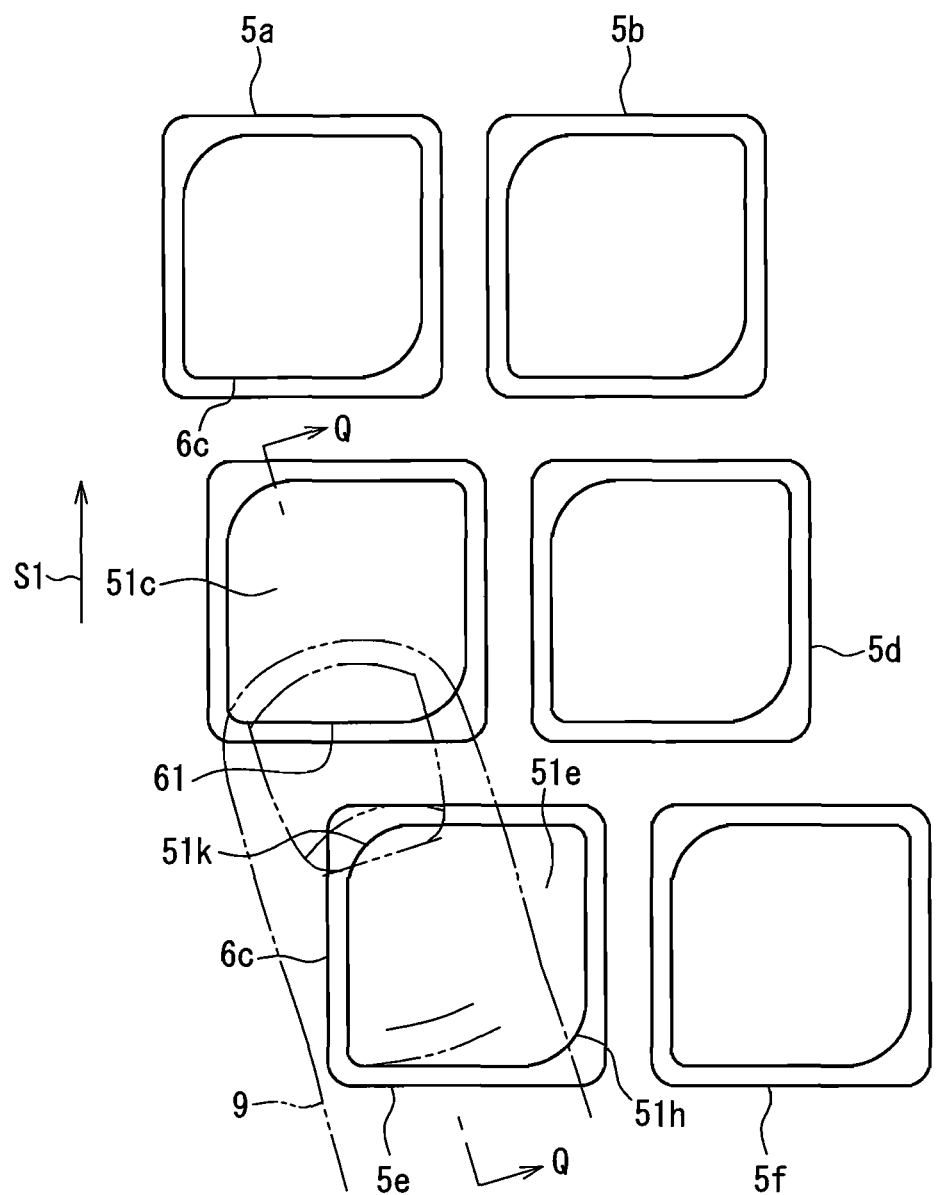
FIG. 12A is a partial magnified view showing a region R2 in FIG. 2.
Figure 12B:
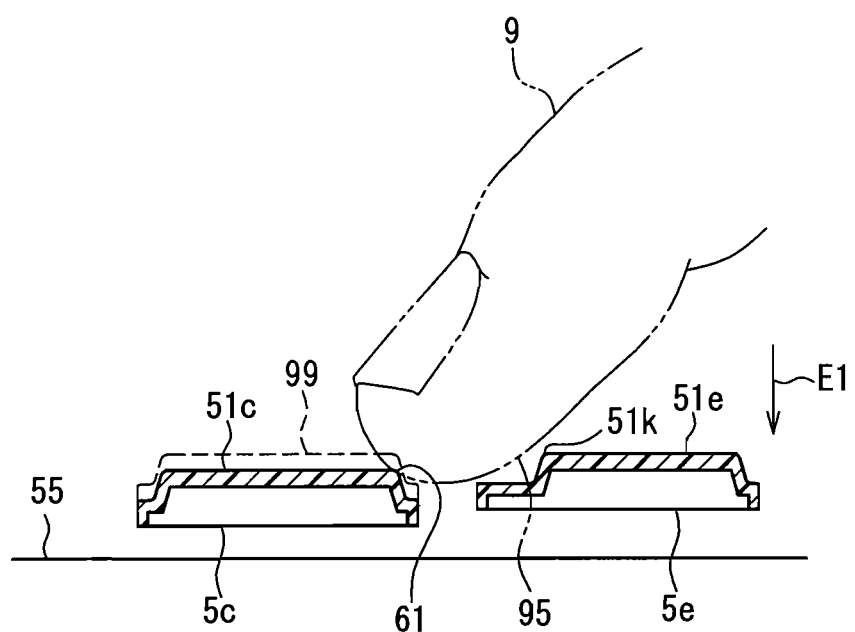
FIG. 12B is a cross-sectional view showing a state where a key is pushed.

FIG. 12A is a partial magnified view showing a state different from the case shown in FIG. 10A, at the time of key-input of the keyboard 5 in this Example of use. FIG. 12B is a schematic cross-sectional view taken along a line Q-Q in FIG. 12A. Members or components common with those in the above Example 1 are assigned with the same reference numbers for avoiding duplicated explanation.

FIG. 12A shows a state where the lower end part and the vicinity are pushed down in the direction indicated with an arrow S1 on the operation surface 51c of the key 5c as the target key by the finger 9 (indicated with an alternate long and two short dashes line) of the user.

In FIG. 12B, the broken line 99 shows a part of the contour of the key top 51 in a state prior to the operation of pushing down the key 5c. In a case of pushing down the operation surface 51c of the key 5c as the target key from the state indicated with the broken line 99, the key top 51 of the key 5c is pushed down in a direction indicated with an arrow E1. At this time, the outer periphery portion 61 of the operation surface 51c of the key 5c is spaced sufficiently from the corner portion 51k of the operation surface 51e of the key 5e as the adjacent key, the operation surface 51e of the key 5e will be unlikely to be pushed together with the operation surface 51c of the key 5c by the finger pad (palm-side surface of finger) 95 of the user. Therefore, in such a case, an incorrect operation or an incorrect input with respect to the adjacent key 5a is unlikely to occur at the time of inputting the target key 5c.

Figure 13A:
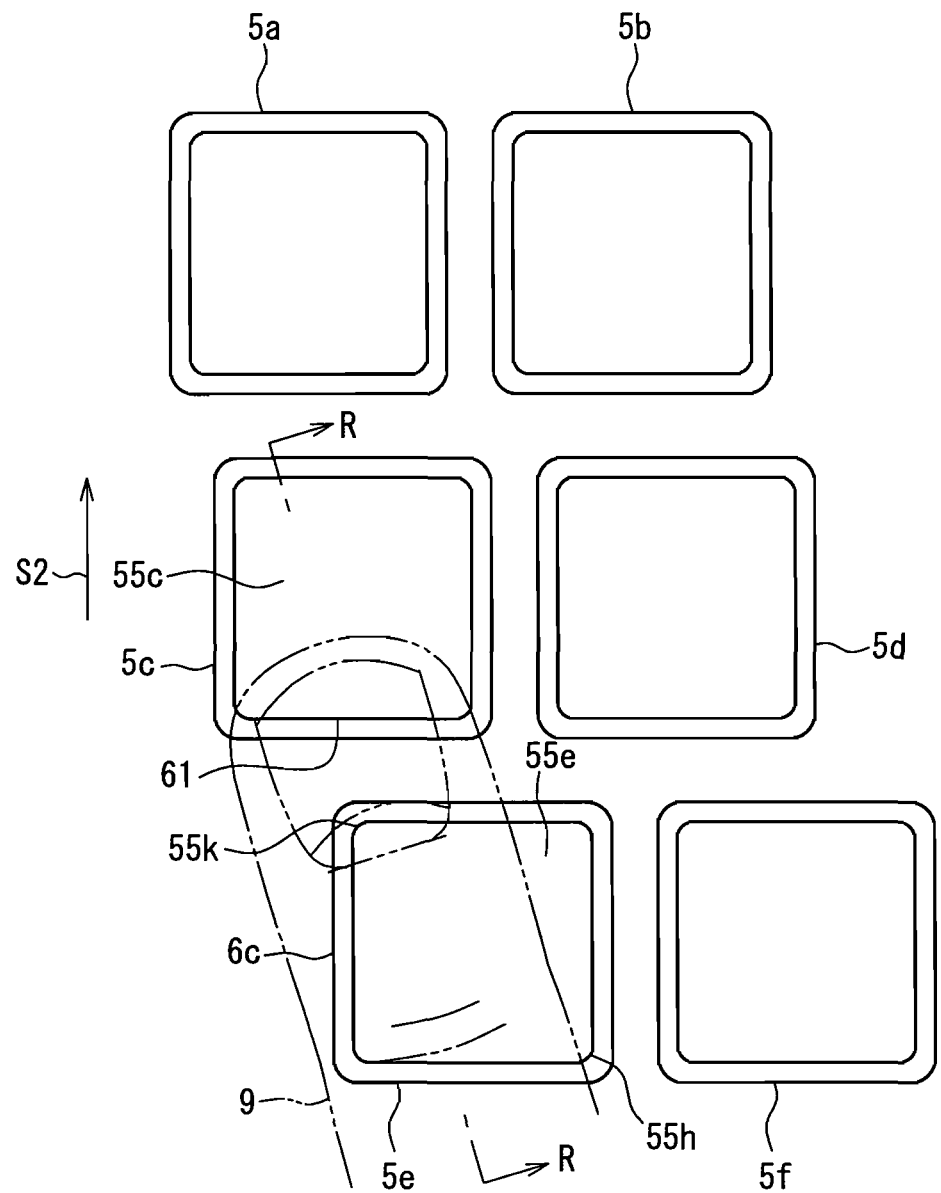
FIG. 13A is a partial magnified view showing a region R2 in a comparative example.
Figure 13B:
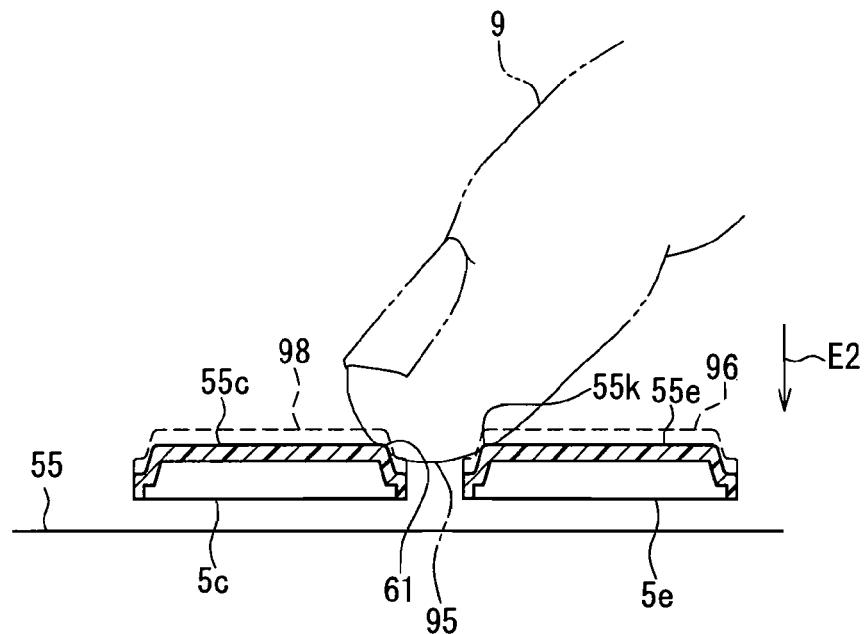
FIG. 13B is a cross-sectional view showing a state where a key is pushed in a comparative example.

Next, a comparative example to the present example of use will be explained. FIG. 13A is a partial magnified view showing the state different from the case shown in FIG. 11A at the time of key-input of the keyboard 5 in the comparative example. FIG. 13B is a schematic cross-sectional view taken along a line R-R in FIG. 13A.

FIG. 13A shows a state where the lower end part and the vicinity on the operation surface 55c of the key 5c as the target key are pushed down by the finger 9 (a range indicated with an alternate long and two short dashes line) of the user in the direction indicated with an arrow S2.

In FIG. 13B, the broken lines 98 and 96 indicate respectively parts of the contours of the key tops 51 in a state prior to the operation of pushing down the keys 5c and 5e respectively. In a case of pushing down the operation surface 55c of the key 5c as the target key from the state indicated with the broken line 98, the key top 51 of the key 5c is pushed down in a direction indicated with the arrow E2. At this time, the outer periphery portion 61 of the operation surface 55c of the key 5c is not spaced sufficiently from the corner portion 55k of the operation surface 51e of the key 5e as the adjacent key in comparison with the case shown in FIG. 12B, and the operation surface 55e of the key 5e is more likely to be pushed together with the operation surface 55c of the key 5c by the finger pad 95 of the user. Therefore, in such a case, an incorrect operation or an incorrect input with respect to the adjacent key 5e will occur more often at the time of inputting the target key 5c.

[7. Effect of the Embodiment, and Others]

As shown in FIG. 4A, the corner portion 51h and the corner portion 51k as the specific corners are formed only in the direction of the diagonal 6f. Namely, the corner portion 51h and the corner portion 51k are formed respectively at the upper-left corner and the lower-right corner when viewed by the user facing the side 6c in FIG. 4A. Therefore, the keyboard 5 of the present embodiment is particularly preferable for a keyboard employing a key layout for typing by moving fingers frontward or backward in the oblique-left direction.

For example, in a case of typing by sliding the fingers on the key tops, the finger will contact easily with the lower-right corner of the operation surface of a key positioned backward in the oblique-left position when viewed by the user, or the upper-left corner of the operation surface of a key positioned frontward in the oblique-left position when viewed by the user. In the present embodiment, as shown in FIG. 4A, the corner portions at the lower-right corner and the upper-left corner of the operation surface of a key are defined as specific corner portions having longer arcs, so that the impact at the time the user's finger contacts with the specific corner portions is relieved to move the fingers smoothly. Thereby, the operability at the time of sliding the fingers on the key tops can be improved.

Further for example, during a typing, the user's fingers may contact easily with the lower-right corner of the operation surface of a key positioned at the back of the key to be typed, or the upper-left corner of the operation surface of the key positioned in front of the key to be typed. In the present embodiment, as shown in FIG. 4A, the lower-right corner portion and the upper-left corner portion of the operation surface of a key are defined as the specific corner portions, and the side face 51e at the specific corner portion is chamfered to have a larger chamfer dimension in comparison with the other corner portions. Therefore, the distance between the user's finger and the corner portion of the operation surface of the adjacent key at the time of pushing down the target key can be increased. As a result, interference of the finger with respect to the adjacent key can be reduced.

In particular, for a case of a small notebook PC having a decreased key pitch for reducing the size, the user often tends to do touch-typing with his fingers standing. As a result, the fingertips will scratch the corner portions of adjacent keys more often. In a case where the keyboard 5 of the present embodiment is employed for the small notebook PC, since a part of the corner portion of the key top is arc-shaped to have a larger arc in comparison with the other corner portions, the fingertips are unlikely to scratch the corner portion of the target key or the adjacent key. Therefore, occurrence of typing errors and the increase of fatigue degree at the time of key-input, which often will be regarded as problems with decreasing the key pitches, can be reduced.

As shown in FIG. 4A, the corner portions positioned in the direction of the diagonal 6g are arc-shaped to have a smaller arc in comparison with the other corner portions. As a result, the area of the operation surface 51a can be increased. If the area of the operation surface 51a can be increased, for example, the region to be in contact with the user's finger can be sufficient, and the operability will not deteriorate. Furthermore, if the area of the operation surface 51a can be increased, for example, the region for printing characters to identify the key top will not be decreased, and thus deterioration in the visibility of the keys can be avoided. In particular, the size and the number of characters to be printed on the key tops vary depending on the specifications in the countries. Therefore, if the area of the operation surface 51a can be increased, the visibility of each character will not deteriorate even in a case where there is a necessity of assigning several letters to one key.

A specific example of application of the keyboard according to the present embodiment will be described below. The following examples are included in one embodiment of the present invention and are not intended to limit the scope of the present invention. Each numerical value in the following examples can be changed suitably in accordance with the size of the notebook PC and/or the size of the whole keyboard.

For example, a key pitch (a distance from the center of a key to the center of an adjacent key) of each key arranged on the keyboard 5 as shown in FIG. 2A can be set to "17 mm" in rows and "14.2 mm" in columns. For example, a key stroke (a depth that a key is pushed down) of each key arranged on the keyboard 5 as shown in FIG. 2A can be set to "2 mm".

For example, a width d4 in the row direction of the contour of the key top 51 in the plan view of FIG. 4A can be set to "16 mm". A width d5 in the column direction of the contour of the key top 51 can be set to "13 mm". For example, a horizontal distance d41 between the side 6b and the side 6c in the operation surface 51a of the key top 51 as shown in FIG. 4A can be set to "13 mm". A horizontal distance d51 between the side 6c and the side 6c in the operation surface 51a can be set to "10 mm".

For example, in the cross-sectional view of the key top 51 as shown in FIG. 4B, a height d6 of the key top 51 in the cross section can be set to "2.5 mm". For example, a height d7 from the base upper face 512m to the operation surface 51a of the key top 51 in the cross-sectional view of FIG. 4B can be set to "1.5 mm".

For example, in the plan view of the key top 51 as shown in FIG. 5A, the radius of curvature of the corner portion 51h can be set to "6 mm". For example, the radius of curvature of the base boundary portion 514m formed outside the corner portion 51h can be set to "4 mm". For example, the radius of curvature of the corner portion 515m of the contour of the key top 51 in the plan view can be set to "2 mm".

The following recitation refers to a result of a comparative experiment in a practical key input by use of a notebook PC provided with the above-mentioned keyboard 5 and a notebook PC provided with a conventional keyboard. The experimental subjects are 27 persons (14 males and 13 females) in their 30s to 50s who use PCs on business or the like on a daily basis. In this experiment, every subject conducted typing for 2 minutes for each of the two types of notebook PCs, and the number of inputs and the number of inputting errors were counted for the two notebook PCs respectively. The experimental result shows that the notebook PC employing the keyboard 5 of the present embodiment decreased the rate of inputting errors by about 10%. In other words, by employing the keyboard 5 according to the present embodiment, the user can increase the accuracy in key input, thereby improving the input efficiency.

As shown in FIG. 4A, in the present embodiment, the base side face 513m of the base portion 51m extending from the protruding portion 51p of the key top 51 is formed to be positioned outside the outer periphery portion 61 of the operation surface 51a in a plan view thereof. Therefore, it will be easy to assemble a conventional key switch mechanism (for example, the link members 52a and 52b, and the dome portion 53 as shown in FIGS. 7A and 7B) inside the base portion 51m. Further, at the same time, it is possible to enhance the independence in shaping the protruding portion 51p (shapes of the operation surface 51a and the side face 51e) formed on the base portion 51m.

Thereby, according to the present application, the operability and the visibility of keys will not deteriorate and thus the occurrence of incorrect inputs and/or incorrect operations can be reduced.

The keyboard 5 in the present embodiment corresponds to an input device. The key 5a or the like in the present embodiment corresponds to an operation unit. The operation surface 51c in the present embodiment corresponds to an operation surface. The four sides (side 6a, side 6b, side 6c, and side 6d) in the present embodiment correspond to a plurality of sides. The corner portion 51g, the corner portion 51h, the corner portion 51n and the corner portion 51k in the present embodiment correspond to a plurality of corner portions. The virtual intersections P1-P4 in the present embodiment correspond to virtual intersections. The center 60 in the present embodiment corresponds to a virtual center. The corner portion 51h and the corner portion 51k in the present embodiment correspond to specific corner portions.

[8. Variations]

[8-1 Variation 1]

In the above-mentioned embodiments, the respective keys on the keyboard 5 are made so that the operation surfaces of the key tops 51 have the same shape in a plan view. However, the present embodiment includes also a variation where the position of the corner portions to be arc-shaped is modified depending on the position for arranging the keys.

Figure 14:
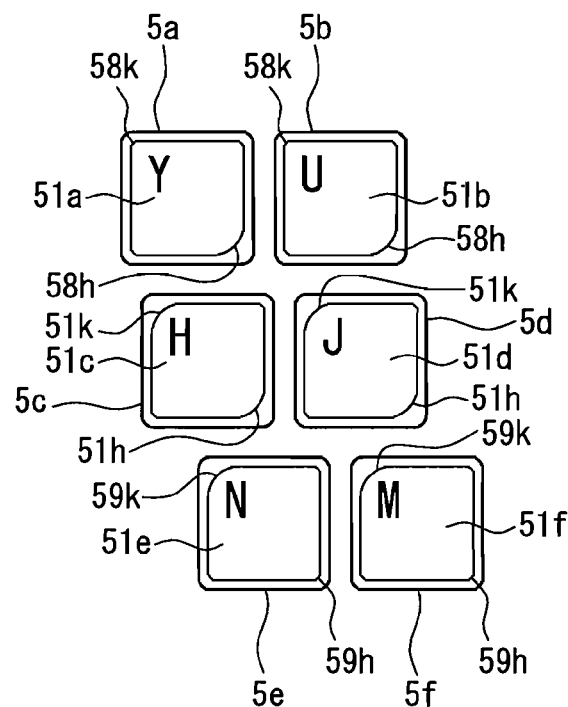
FIG. 14 is a partial magnified view showing a region R2 in a variation.

FIG. 14 is a partial magnified view showing the region R2 of FIG. 2 in the present variation. As shown in FIG. 14, the keys are arranged respectively in an upper row including the layout of the key 5a and the key 5b, a middle row including the layout of the key 5c and the key 5d, and a lower row including the layout of the key 5e and the key 5f.

In this case, the upper row including the layout of the key 5a and the key 5b has the largest perpendicular distance from the user in comparison with the keys in the other rows. The lower row including the layout of the key 5e and the key 5f has the smallest perpendicular distance from the user in comparison with the keys in the other row. And the middle row including the layout of the key 5c and the key 5d has the smaller perpendicular distance from the user in comparison with the keys in the upper row, and the larger perpendicular distance from the user in comparison with the keys in the lower row.

On the operation surface 51c of the key 5c and the operation surface 51d of the key 5d, which are in the middle row, the corner portions 51h and the corner portions 51k at the lower-right corners and the upper-left corners when viewed by the user are formed as specific corner portions.

On the operation surface 51a of the key 5a and the operation surface 51b of the key 5b, which are in the upper row, the corner portions 58h at the lower-right corners when viewed by the user are formed as specific corner portions. However, the corner portions 58k at the upper-left corners when viewed by the user are not formed as specific corner portions.

On the operation surface 51e of the key 5e and the operation surface 51f of the key 5f, which are in the lower row, the corner portions 59h at the upper-left corners when viewed by the user are formed as specific corner portions. However, the corner portions 59h at the lower-right corners when viewed by the user are not formed as specific corner portions.

In this case, for the key 5a and 5b in the upper row, or for the key 5e and the key 5f in the lower row, the areas of the operation surfaces of the key tops 51 can be increased. Thereby the visibility can be improved further.

The upper row, the middle row and the lower row in the present embodiment correspond to the upper row, the middle row and the lower row arranged in accordance with the order of distance between the key tops and the operator. The operation surface 51a of the key 5a and the operation surface 51b of the key 5b positioned in the upper row in the present embodiment correspond to the operation surfaces of key tops arranged in the upper row. The operation surface 51c of the key 5c and the operation surface 51d of the key 5d positioned in the middle row in the present embodiment correspond to the operation surfaces of key tops arranged in the middle row. And the operation surface 51e of the key 5e and the operation surface 51f of the key 5f positioned in the middle row in the present embodiment correspond to the operation surfaces of key tops arranged in the lower row.

[8-2 Variation 2]

Figure 15:
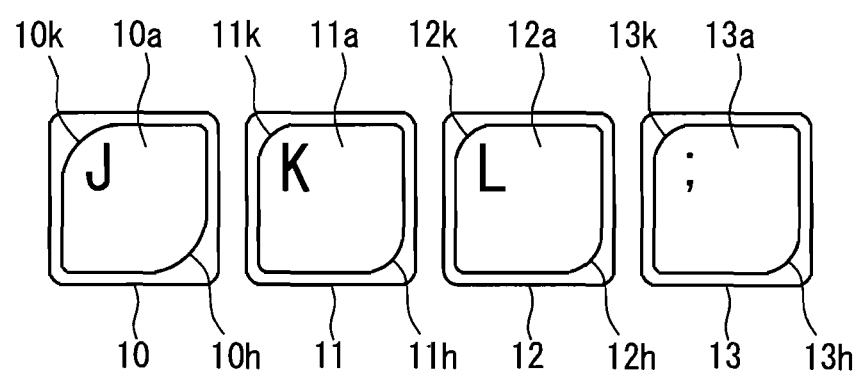
FIG. 15 is a partial magnified view showing a keyboard 5 in a variation.

In the embodiments above, regarding the respective keys on the keyboard 5, the operation surfaces of the key tops 51 have the same shape in a plan view. However, the present embodiment includes also a variation in which the dimensions of arcs formed at the corner portions are varied among the keys. FIG. 15 is a partial magnified view showing the respective keys ("J" key 10, "K" key 11, "L" key 12 and ";" key 13) as home positions on which the fingers of right hand are placed.

As shown in FIG. 15, the arcs at the corner portion 10h and the corner portion 10k of the operation surface 10a on the "J" key 10 are longer than the arcs at the corner portion 11a and the corner portion 11k of the operation surface 11a on the "K" key 11 for example. The following description relates to advantages obtained by making the arcs at the corner portion 10h and the corner portion 10k of the "J" key 10 longer than those of the other keys.

For example, as having been explained with reference to FIG. 2A, in general, the right second finger (right index finger) of a user who performs touch-typing is responsible for inputting the "U" key and the "M" key positioned backward or frontward in the oblique-left direction from the "J" key as the home position, and furthermore, the "Y" key, the "H" key and the "N" key positioned within the region R2 to be covered by this finger. Similarly, in general, the left second finger (left index finger) is responsible for inputting the "R" key and the "V" key positioned backward or frontward in the oblique-left direction from the "F" key as the home position, and furthermore, the "T" key, the "G" key and the "B" key positioned within the region L2 to be covered by this finger.

In this case, since the right second finger and the left second finger are responsible for many keys and the fingers move in wide ranges, incorrect inputs and/or incorrect operations will occur more often. For this reason, such incorrect inputs and/or incorrect operations can be prevented efficiently by increasing in particular the length of arcs in the arc shape formed at the corner portions of operation surfaces to be covered by the right second finger and the left second finger.

The dimension of the arc formed at the corner portions may be varied among the plurality of keys. For example, the arcs formed at the corner portion 11h and the corner portion 11k of the operation surface 11a on the "K" key 11 may be made larger than the arcs formed at the corner portion 12h and the corner portion 12k of the operation surface 12a on the "L" key 12. Furthermore, the arcs formed at the corner portion 12h and the corner portion 12k of the operation surface 12a on the "L" key 12 may be made larger than the arcs formed at the corner portion 13h and the corner portion 13k of the operation surface 13a on the ";" key 13.

[8-3. Variation 3]

In the above embodiments, the corner portions are shaped to have arcs extending outside the operation surface 51a. The present embodiment includes also a case where the corner portions are arc-shaped to be bent inward the operation surface 51a (toward the center 60).

For example, in FIGS. 5A and 5B, assuming that the arc shape of the corner portion 51h and the corner portion 51n were arcs bent inward (toward the center 60), the corner portion 51h as a specific corner portion has an arc larger than that of the corner portion 51n other than the specific corner portion, similarly to the case mentioned above. As a result, the intersection 511h of the corner portion 51h is located closer to the center 60 than the intersection 511n of the corner portion 51n. In contrast, the intersection 511n of the corner portion 51n is located farther from the center 60 than the intersection 511h of the corner portion 51h. Therefore, the distance L11 as a linear distance between the intersection 511h and the virtual intersection P2 becomes greater than the distance L21 as a linear distance between the intersection 511n and the virtual intersection P3.

In this case, the area including the node P21 between the corner portion 51h and the side 6b and also the node P22 between the corner portion 51n and the side 6c and the vicinity as shown in FIG. 5A may have a sharp shape in a plan view. Therefore, it is preferable that a part of the side face 51e, which extends downward from the area including the node P21 and the node P22 is chamfered with a curved surface or a plane. Thereby, in a case of sliding a finger so as to contact with the outer periphery portion of the operation surface, the finger will be unlikely to scratch the corner portion of the key top.

The disclosure of the present application is useful for an input device.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An input device comprising a plurality of operation units for detecting input signals through descending-ascending movement of pushed and returned operation surfaces,
   wherein each of the operation units has an operation surface for accepting an input operation,
   the operation surface has a rectangular contour in a plan view, comprising a plurality of sides and a plurality of corner portions,
   when a point at which extensions of adjacent two of the plural sides cross each other is defined as a virtual intersection and an intersection of a plurality of diagonals linking the virtual intersections is defined as a virtual center,
   the contour of the corner portion crosses the diagonal that passes through the virtual intersection and the virtual center, at a position between the virtual intersection in the vicinity of the corner portion and the virtual center,
   at least one of the corner portions is a specific corner portion having an intersection with the diagonal at a position closer to the virtual center than the adjacent two corner portions, and
   the extensions of the adjacent two of the plural sides are perpendicular to each other.

2. The input device according to claim 1, wherein each of the operation units has a side face extending continuously from the operation surface in the push-down direction and a base portion formed extending continuously from the side face, and
   the contour of the base portion in a plan view is outside the contour of the operation surface in a plan view.

3. The input device according to claim 1, wherein the operation unit is arranged so that one of the sides in the contour in a plan view of the operation surface faces an operator, and
   the specific corner portion is formed at at least one of the lower-right corner and the upper-left corner of the rectangle when viewed by the operator.

4. The input device according to claim 1, wherein the operation unit is arranged so that one of the sides in the contour in a plan view of the operation surface opposes an operator,
   the operation units are classified to be arranged in an upper row, a middle row and a lower row in accordance with the order of distance from the operator,
   on the operation surface of each operation unit arranged in the upper row, the specific corner portion is formed at the lower-right corner when viewed by the operator,
   on the operation surface of each operation unit arranged in the middle row, the specific corner portions are formed at the lower-right corner and the upper-left corner when viewed by the operator, and
   on the operation surface of each operation unit arranged in the lower row, the specific corner portion is formed at the upper-left corner when viewed by the operator.

5. An input device comprising a plurality of operation units for detecting input signals through descending-ascending movement of pushed and returned operation surfaces,
   wherein each of the operation units has an operation surface for accepting an input operation,
   the operation surface has a rectangular contour in a plan view, comprising a plurality of sides and a plurality of corner portions,
   when a point at which extensions of adjacent two of the plural sides cross each other is defined as a virtual intersection and an intersection of a plurality of diagonals linking the virtual intersections is defined as a virtual center,
   the contour of the corner portion crosses the diagonal that passes through the virtual intersection and the virtual center, at a position between the virtual intersection in the vicinity of the corner portion and the virtual center,
   at least one of the corner portions is a specific corner portion having an intersection with the diagonal at a position closer to the virtual center than the adjacent two corner portions, and
   each of the operation units has a side face extending continuously from the operation surface in the push-down direction and a base portion extending outward continuously from an outer periphery of the side face at an end of the side face distal from the operational surface, and the extensions of the adjacent two of the plural sides are substantially perpendicular to each other.

6. The input device according to claim 5, wherein the base portion in a plan view has a rectangular contour having four corner portions, and the four corner portions of the base portion are shaped as arcs having the same curvature.

7. The input device according to claim 5, wherein the base portion in a plan view has a rectangular contour having four sides, and in a plan view each of the four sides of the base portion is parallel to a respective side of the operation surface.

* * * * *